US012687703B2

(12) United States Patent
Yang et al.

(10) Patent No.: US 12,687,703 B2
(45) Date of Patent: Jul. 21, 2026

(54) CAMERA OPTICAL LENS

(71) Applicant: AAC OPTICS (CHANGZHOU) CO., LTD., Changzhou (CN)

(72) Inventors: Tingting Yang, Changzhou (CN); Shunda Zhou, Changzhou (CN)

(73) Assignee: AAC OPTICS (CHANGZHOU) CO., LTD., Changzhou (CN)

( * ) Notice: Subject to any disclaimer, the term of this patent is extended or adjusted under 35 U.S.C. 154(b) by 240 days.

(21) Appl. No.: 18/742,887

(22) Filed: Jun. 13, 2024

(65) Prior Publication Data

US 2025/0306342 A1 Oct. 2, 2025

(30) Foreign Application Priority Data

Mar. 26, 2024 (CN) .......................... 202410353471.4

(51) Int. Cl.
*G02B 13/00* (2006.01)
*G02B 9/64* (2006.01)

(52) U.S. Cl.
CPC ........... *G02B 13/0045* (2013.01); *G02B 9/64* (2013.01)

(58) Field of Classification Search
CPC ...... G02B 13/0045; G02B 9/64; G02B 13/00; G02B 13/06; G02B 13/18; G02B 13/0015
See application file for complete search history.

(56) References Cited

U.S. PATENT DOCUMENTS

2022/0229272 A1* 7/2022 Lyu ..................... G02B 13/0045
2023/0185058 A1* 6/2023 Yan ..................... G02B 13/0045
359/755

* cited by examiner

*Primary Examiner* — James C. Jones
(74) *Attorney, Agent, or Firm* — Wiersch Law Group

(57) ABSTRACT

The present application relates to the field of optical lenses and discloses a camera optical lens, comprising seven lenses. The seven lenses are in order from the objective surface to the image surface: a first lens having a positive refractive force, a second lens having a negative refractive force, a third lens having a positive refractive force, a fourth lens having a negative refractive force, a fifth lens having a refractive force, a sixth lens having a positive refractive force and a seventh lens having a negative refractive force; and the following relationship expressions are satisfied: 0.95≤f1/f≤1.25; 60.00≤v1≤82.00; −4.00≤R13/R14≤−1.00; and 1.50≤d4/d6≤5.00. The camera optical lens provided by the present application has excellent optical performance while satisfying the design requirements of large aperture, ultra-thinness, and ultra-wide angle.

10 Claims, 12 Drawing Sheets

Axial Aberration

656nm

588nm

436nm

546nm

486nm

Millimeter

CAMERA OPTICAL LENS

CROSS-REFERENCE TO RELATED APPLICATIONS

This application claims the priority of Chinese Patent Application No. 202410353471.4, entitled "CAMERA OPTICAL LENS", filed with the China National Intellectual Property Administration on Mar. 26, 2024, which is incorporated herein by reference in its entirety.

TECHNICAL FIELD

The present application relates to the field of optical lenses, in particular to a camera optical lens applicable to handheld terminal devices such as smartphones and digital cameras, as well as camera devices such as monitors and PC lenses.

BACKGROUND

In recent years, with the rise of various smart devices, the demand for miniaturized camera optical lenses has been increasing. Additionally, due to the reduction in pixel size of photosensitive devices and the current trend of electronic products towards better functionality and lighter, miniaturized camera optical lenses with good imaging quality have become the mainstream in the market. To achieve better imaging quality, multi-element lens structures are often employed. Furthermore, with the advancement of technology and the increasing diversity of user demands, coupled with the continuous reduction in pixel area of photosensitive devices and the escalating requirements for imaging quality, the seven-element lens structure has gradually emerged in lens design. There is an urgent need for wide-angle camera lenses with excellent optical characteristics, compact size, and fully corrected aberrations.

SUMMARY

In response to the above problem, an object of the present application is to provide a camera optical lens that has good optical performance and also meets the design requirements of large aperture, ultra-thinness, and ultra-wide angle.

In order to realize the above object, the technical solution of the present application provides a camera optical lens, comprising seven lenses, the seven lenses being in order from an objective side to an image side: a first lens having a positive refractive force, a second lens having a negative refractive force, a third lens having a positive refractive force, a fourth lens having a negative refractive force, a fifth lens having a refractive force, a sixth lens having a positive refractive force, and a seventh lens having a negative refractive force lens; wherein a focal length of the first lens is f1; a focal length of the camera optical lens is f; an Abbe number of the first lens is v1; a central radius of curvature of an objective surface of the seventh lens is R13; a central radius of curvature of an image surface of the seventh lens is R14, an on-axis distance between the second lens and the third lens is d4; an on-axis distance between the third lens and the fourth lens is d6, and the following relationship expressions are satisfied: $0.95 \leq f1/f \leq 1.25$; $60.00 \leq v1 \leq 82.00$; $-4.00 \leq R13/R14 \leq -1.00$; $1.50 \leq d4/d6 \leq 5.00$.

In one embodiment, a central radius of curvature of an objective surface of the fourth lens is R7; a central radius of curvature of an image surface of the fourth lens is R8, and the following relationship expression is satisfied: $2.00 \leq (R7+R8)/(R7-R8) \leq 20.00$.

In one embodiment, an objective surface of the first lens is convex at a proximal-axis position, and an image surface of the first lens is concave at a proximal-axis position; a central radius of curvature of the objective surface of the first lens is R1, and a central radius of curvature of the image surface of the first lens is R2; an on-axis thickness of the first lens is d1; a total track length of the camera optical lens is TTL, and the following relationship expressions are satisfied: $-4.14 \leq (R1+R2)/(R1-R2) \leq -1.06$; $0.06 \leq d1/TTL \leq 0.21$.

In one embodiment, an objective surface of the second lens is convex at a proximal-axis position, and an image surface of the second lens is concave at a proximal-axis position; a focal length of the second lens is f2; a central radius of curvature of the objective surface of the second lens is R3, and a central radius of curvature of the image surface of the second lens is R4; an on-axis thickness of the second lens is d3; a total track length of the camera optical lens is TTL, and the following relationship expressions are satisfied: $-15.86 \leq f2/f \leq -3.01$; $2.67 \leq (R3+R4)/(R3-R4) \leq 12.77$; $0.02 \leq d3/TTL \leq 0.05$.

In one embodiment, an image surface of the third lens is convex at a proximal-axis position; a focal length of the third lens is f3; a central radius of curvature of an objective surface of the third lens is R5, and a central radius of curvature of the image surface of the third lens is R6; an on-axis thickness of the third lens is d5; a total track length of the camera optical lens is TTL, and the following relationship expressions are satisfied: $3.47 \leq f3/f \leq 24.78$; $-0.25 \leq (R5+R6)/(R5-R6) \leq 1.61$; $0.03 \leq d5/TTL \leq 0.12$.

In one embodiment, an objective surface of the fourth lens is convex at a proximal-axis position, and an image surface of the fourth lens is concave at a proximal-axis position; a focal length of the fourth lens is f4; an on-axis thickness of the fourth lens is d7; a total track length of the camera optical lens is TTL, and the following relationship expressions are satisfied: $-62.59 \leq f4/f \leq -2.51$; $0.02 \leq d7/TTL \leq 0.06$.

In one embodiment, an objective surface of the fifth lens is convex at a proximal-axis position, and an image surface of the fifth lens is concave at a proximal-axis position; a focal length of the fifth lens is f5; a central radius of curvature of the objective surface of the fifth lens is R9, and a central radius of curvature of the image surface of the fifth lens is R10; an on-axis thickness of the fifth lens is d9; a total track length of the camera optical lens is TTL, and the following relationship expressions are satisfied: $-30.01 \leq f5/f \leq 27.49$; $-7.90 \leq (R9+R10)/(R9-R10) \leq 6.02$; $0.04 \leq d9/TTL \leq 0.13$.

In one embodiment, an objective surface of the sixth lens is convex at a proximal-axis position, and an image surface of the sixth lens is concave at a proximal-axis position; a focal length of the sixth lens is f6; a central radius of curvature of the objective surface of the sixth lens is R11, and a central radius of curvature of the image surface of the sixth lens is R12; an on-axis thickness of the sixth lens is d11; a total track length of the camera optical lens is TTL, and the following relationship expressions are satisfied: $0.46 \leq f6/f \leq 1.71$; $-3.58 \leq (R11+R12)/(R11-R12) \leq -1.11$; $0.04 \leq d11/TTL \leq 0.13$.

In one embodiment, the objective surface of the seventh lens is concave at a proximal-axis position, and the image surface of the seventh lens is concave at a proximal-axis position; a focal length of the seventh lens is f7; an on-axis thickness of the seventh lens is d13; a total track length of the camera optical lens is TTL, and the following relationship expressions are satisfied: $-1.41 \leq f7/f \leq -0.43$; $0.02 \leq d13/TTL \leq 0.09$.

In one embodiment, the first lens is made of glass.

The beneficial effect of the present application is that the camera optical lens according to the present application has excellent optical characteristics and is characterized by a large aperture, wide angle, and ultra-thinness, and is particularly suitable for smartphone camera lens assemblies and WEB camera lenses including camera elements such as CCD and CMOS for high pixels.

BRIEF DESCRIPTION OF THE DRAWINGS

In order to more clearly illustrate the technical solutions in the embodiments of the present application, the accompanying drawings that need to be used in the description of the embodiments will be briefly introduced as follows. Obviously, the accompanying drawings in the following description are only some of the embodiments of the present application, and for the person of ordinary skill in the field, other accompanying drawings can be obtained based on these drawings without putting forth any creative labor.

DETAILED DESCRIPTION OF THE EMBODIMENTS

Figures 1, 2:
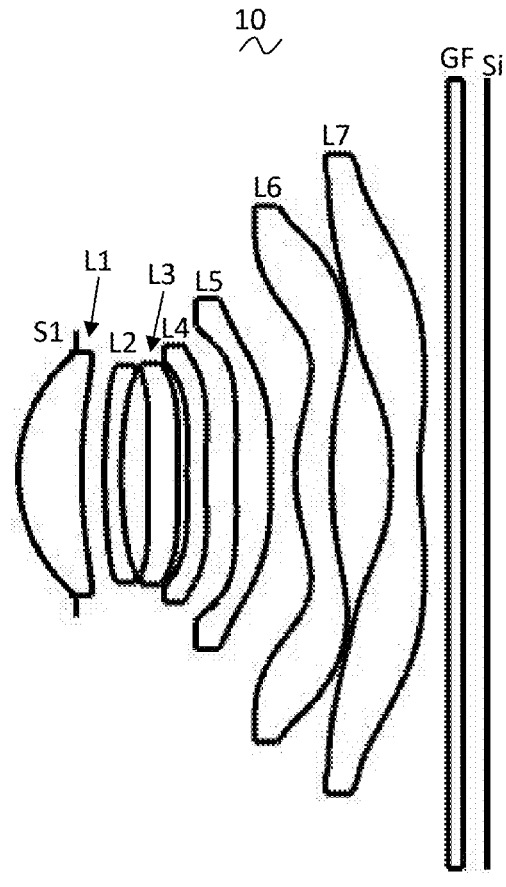
FIG. 1 is a structural schematic diagram of a camera optical lens according to the first embodiment of the present application.
FIG. 2 is a schematic diagram of the axial aberration of the camera optical lens shown in FIG. 1.

In order to make the objects, technical solutions, and advantages of the present application clearer, various embodiments of the present application will be described in detail below in connection with the accompanying drawings. However, those of ordinary skill in the art can understand that in the various embodiments of the present application, a number of technical details have been proposed in order to enable the reader to better understand the present application, and even without these technical details and various variations and modifications based on the following various embodiments, the technical solution claimed to be protected by the present application can be realized.

As shown in the accompanying drawings, a technical solution of the present application provides a camera optical lens 10, 20, 30, 40, 50. The camera optical lens 10, 20, 30, 40, 50 of the present application is shown in FIGS. 1, 5, 9, 13, 17. The camera optical lens 10, 20, 30, 40, 50 includes a total of seven lenses. Specifically, the camera optical lens, in order from an objective side to an image side, includes: an aperture S1, a first lens L1, a second lens L2, a third lens L3, a fourth lens L4, a fifth lens L5, a sixth lens L6, and a seventh lens L7. Optical elements such as an optical filter GF may be provided between the seventh lens L7 and the image plane Si.

The first lens L1 is made of glass. The second lens L2 is made of plastic. The third lens L3 is made of plastic. The fourth lens L4 is made of plastic. The fifth lens L5 is made of plastic. The sixth lens L6 is made of plastic, and the seventh lens L7 is made of plastic. Each lens may also be made of other materials.

The objective surface and image surface of the first lens L1, the second lens L2, the third lens L3, the fourth lens L4 the fifth lens L5, the sixth lens L6, and the seventh lens L7 are aspherical.

It is defined that a focal length of the camera optical lens is f, a focal length of the first lens L1 is f1, and the following relationship expression is satisfied $0.95 \leq f1/f \leq 1.25$, in which a ratio of the focal length of the first lens L1 to the focal length of the camera optical lens is specified. Within the range, the camera optical lens is made to have a better imaging quality and lower sensitivity by reasonably distributing the optical focal length of the camera optical lens.

It is defined that an Abbe number of the first lens L1 is v1, and the following relationship expression is satisfied: $60.00 \leq v1 \leq 82.00$, in which the Abbe number of the first lens L1 is specified. Within the range, the material properties can be efficiently assigned and chromatic aberration can be efficiently corrected, so that the chromatic aberration |LC|≤4.0 μm.

It is defined that a central radius of curvature of an objective surface of the seventh lens L7 is R13, a central radius of curvature of an image surface of the seventh lens L7 is R14, and the following relationship expression is satisfied: −4.00≤R13/R14≤−1.00, in which the shape of the seventh lens L7 is specified. Within the range of the relationship expression, it is conducive to correcting the image dispersion and aberration of the camera optical lens, so that the distortion |Distortion|≤2.5%, thereby reducing the likelihood of dark corners arising.

It is defined that an on-axis distance between the second lens L2 and the third lens L3 is d4, an on-axis distance between the third lens L3 and the fourth lens L4 is d6, and the following relationship expression is satisfied: 1.50≤d4/d6≤5.00. The above relationship expression specifies a ratio of an air spacing between the second and third lenses to an air spacing between the third and fourth lenses. By reasonably allocating the air spacing between the lenses, it is conducive to reducing the difficulty of assembly in the actual production process and improving the yield rate.

In the case of satisfying the above relationship expressions, the camera optical lens 10, 20, 30, 40, 50 has excellent optical performance and also can satisfy the design requirements of large aperture, wide-angle, and ultra-thin. According to the characteristics of the camera optical lens 10, 20, 30, 40, 50, the camera optical lens 10, 20, 30, 40, 50 is particularly suitable for use in camera elements composed of CCD, CMOS, and other camera elements used for high pixel counts. The camera optical lens 10, 20, 30, 40, 50 are particularly suitable for smartphone camera lens assemblies and WEB camera lenses including camera elements such as CCD and CMOS for high pixels.

Based on the above relationship expression and the functions that can be realized, the characteristics of each lens are further refined as follows.

It is defined that a central radius of curvature of an objective surface of the fourth lens L4 is R7, a central radius of curvature of an image surface of the fourth lens L4 is R8, and the following relationship expression is satisfied: 2.00≤(R7+R8)/(R7−R8)≤20.00. The above relationship expression specifies the shape of the fourth lens L4. Within the range of the relationship expression, it is conducive to alleviating the degree of refraction of the light passing through the lens, thereby well reducing the aberration.

An objective surface of the first lens L1 is convex at a proximal-axis position, an image surface is concave at a proximal-axis position, and the first lens L1 has a positive refractive force. The objective surface and the image surface of the first lens L1 may also be set to other concave and convex distributions.

It is defined that a central radius of curvature of the objective surface of the first lens L1 is R1, a central radius of curvature of the image surface of the first lens L1 is R2, and the following relationship expression is satisfied −4.14≤(R1+R2)/(R1−R2)≤−1.06. By reasonably controlling the shape of the first lens L1, the first lens L1 is made to be capable of effectively correcting the system spherical aberration. In an embodiment, −2.59≤(R1+R2)/(R1−R2)≤−1.33 is satisfied.

An on-axis thickness of the first lens L1 is d1, a total track length of the camera optical lens 10 is TTL, and the following relationship expression is satisfied 0.06≤d1/TTL≤0.21. Within the range of the relationship expression, it is conducive to realizing ultra-thinness. In an embodiment, 0.10≤d1/TTL≤0.16 is satisfied.

An objective surface of the second lens L2 is convex at a proximal-axis position, an image surface is concave at a proximal-axis position, and the second lens L2 has a negative refractive force. The objective surface and image surface of the second lens L2 may also be set to other concave and convex distributions.

It is defined that a focal length of the second lens L2 is f2, and the following relationship expression is satisfied −15.86≤f2/f≤−3.01. By controlling the negative optical focus of the second lens L2 in a reasonable range, it is conducive to correcting the aberration of the optical system. In an embodiment, −9.91≤f2/f≤−3.77 is satisfied.

It is defined that a central radius of curvature of the objective surface of the second lens L2 is R3, a central radius of curvature of the image surface of the second lens L2 is R4, and the following relationship expression is satisfied 2.67≤(R3+R4)/(R3−R4)≤12.77. By reasonably controlling the shape of the second lens L2, the second lens L2 is able to effectively correct the system spherical aberration. In an embodiment, 4.27≤(R3+R4)/(R3−R4)≤10.22 is satisfied.

An on-axis thickness of the second lens L2 is d3, and the following relationship expression is satisfied: 0.025≤d3/TTL≤0.05. Within the range of the relationship expression, it is conducive to realizing ultra-thinness. In an embodiment, 0.03≤d3/TTL≤0.04 is satisfied.

An objective surface of the third lens L3 is convex or concave at a proximal-axis position, an image surface is convex at a proximal-axis position, and the third lens L3 has a positive refractive force. The image surface of the third lens L3 may also be set to other concave or convex distributions.

It is defined that a focal length of the third lens L3 is f3, and the following relationship expression is satisfied 3.47≤f3/f≤24.78. By reasonably distributing the optical focal length, the system is made to have better imaging quality and lower sensitivity. In an embodiment, 5.55≤f3/f≤19.82 is satisfied.

A central radius of curvature of the objective surface of the third lens L3 is R5, a central radius of curvature of the image surface of the third lens L3 is R6, and the following relationship expression is satisfied −0.25≤(R5+R6)/(R5−R6)≤1.61, in which the shape of the third lens L3 is specified. Within the range, it is conducive to correcting the problem of on-axis chromatic aberration with the development of the lens to ultra-thin wide angle. In an embodiment, −0.16≤(R5+R6)/(R5−R6)≤1.29 is satisfied.

An on-axis thickness of the third lens L3 is d5, a total track length of the camera optical lens is TTL, and the following relationship expression is satisfied 0.03≤d5/TTL≤0.12. Within the range of the relationship expression, it is conducive to realizing ultra-thinness. In an embodiment, 0.05≤d5/TTL≤0.09 is satisfied.

An objective surface of the fourth lens L4 is convex at a proximal-axis position, an image surface is concave at a proximal-axis position, and the fourth lens L4 has a negative refractive force. The objective surface and image surface of the fourth lens L4 may also be set to other concave and convex distributions.

It is defined that a focal length of the fourth lens L4 is f4, and the following relationship expression is satisfied −62.59≤f4/f≤−2.51. By reasonably distributing the optical focal length, the system is made to have better imaging quality and lower sensitivity. In an embodiment, −39.12≤f4/f≤−3.14 is satisfied.

An on-axis thickness of the fourth lens L4 has d7, and the following relationship expression is satisfied: 0.02≤d7/TTL≤0.06. Within the range of the relationship expression, it is conducive to realizing ultra-thinness. In an embodiment, 0.03≤d7/TTL≤0.05 is satisfied.

An objective surface of the fifth lens L5 is convex at a proximal-axis position, an image surface is concave at a proximal-axis position, and the fifth lens L5 has a positive refractive force or a negative refractive force. The objective surface and the image surface of the fifth lens L5 may also be set to other concave and convex distributions.

A focal length of the fifth lens L5 is f5, and the following relationship expression is satisfied: −30.01≤f5/f≤27.49. With the limit of the fifth lens L5, it can effectively make the angle of light from the camera optical lens 10 flat and reduce the tolerance sensitivity. In an embodiment, −18.76≤f5/f≤21.99 is satisfied.

A central radius of curvature of the objective surface of the fifth lens L5 is R9, a central radius of curvature of the image surface of the fifth lens L5 is R10, and the following relationship expression: −7.90≤(R9+R10)/(R9−R10)≤6.02, in which the shape of the fifth lens L5 is specified. Within the range of the relationship expression, it is conducive to correcting the astigmatism and distortion of the camera optical lens 10. In an embodiment, −4.94≤(R9+R10)/(R9−R10)≤4.81 is satisfied.

An on-axis thickness of the fifth lens L5 is d9, and the following relationship expression is satisfied 0.04≤d9/TTL≤0.13. Within the range of the relationship expression, it is conducive to realizing ultra-thinness. In an embodiment, 0.06≤d9/TTL≤0.10 is satisfied.

An objective surface of the sixth lens L6 is convex at a proximal-axis position, an image surface is concave at a proximal-axis position, and the sixth lens L6 has a positive refractive force. The objective surface and image surface of the sixth lens L6 may also be set to other concave and convex distributions.

It is defined that a focal length of the sixth lens L6 is f6, and the following relationship expression is satisfied: 0.46≤f6/f≤1.71. By reasonably distributing the optical focal length, the system is made to have better imaging quality and lower sensitivity. In an embodiment, 0.74≤f6/f≤1.37 is satisfied.

A central radius of curvature of the objective surface of the sixth lens L6 is R11, a central radius of curvature of the image surface of the sixth lens L6 is R12, and the following relationship expression is satisfied: −3.58≤(R11+R12)/(R11−R12)≤−1.11, in which the shape of the sixth lens L6 is specified. Within the range of the relationship expression, it is conducive to correcting the aberration of the off-axis drawing angle and the like with the development of the ultra-thin wide angle. In an embodiment, −2.24≤(R11+R12)/(R11−R12)≤−1.38 is satisfied.

An on-axis thickness of the sixth lens L6 is d11, and the following relationship expression is satisfied 0.04≤d11/TTL≤0.13. Within the range of the relationship expression, it is conducive to realizing ultra-thinness. In an embodiment, 0.06≤d11/TTL≤0.10 is satisfied.

An objective surface of the seventh lens L7 is concave at a proximal-axis position, an image surface is concave at a proximal-axis position, and the seventh lens L7 has a negative refractive force. The objective surface and image surface of the seventh lens L7 may also be set to other concave and convex distributions.

It is defined that a focal length of the camera optical lens is f, a focal length of the seventh lens L7 is f7, and the following relationship expression is satisfied: −1.41≤f7/f≤−

0.43. By reasonably distributing the optical focal length, the system is made to have better imaging quality and lower sensitivity. In an embodiment, −0.88≤f7/f≤−0.53 is satisfied.

An on-axis thickness of the seventh lens L7 is d13, and the following relationship expression is satisfied: 0.025d13/TTL≤0.09. Within the range of the relationship expression, it is conducive to realizing ultra-thinness. In an embodiment, 0.03≤d13/TTL≤0.07 is satisfied.

An image height of the camera optical lens is IH, and the following relationship expression is satisfied: TTL/IH≤1.29, so that it is conducive to realizing ultra-thinness.

A field of view FOV of the camera optical lens is greater than or equal to 82.98°, thus realizing a wide angle.

An aperture value FNO of the camera optical lens is less than or equal to 1.618, thereby realizing a large aperture, which enables excellent imaging performance of the camera optical lens.

The camera optical lens of the present application will be described below by way of examples. The symbols recorded in each example are shown below. The units of the focal length, on-axis distance, central radius of curvature, on-axis thickness, position of the inflection point, and position of the stationary point are mm.

TTL: total track length (on-axis distance from the objective surface of the first lens L1 to the image plane Si) in mm;

Aperture value FNO: a ratio of the effective focal length of the camera optical lens to the entrance pupil diameter.

The technical solutions of the present application are next specified in five embodiments, and a comparative embodiment is also provided as a reference illustration, in which the technical effect of the present application cannot be realized when exceeding the range of the above relationship expressions.

First Embodiment

Tables 1 and 2 illustrate the design data of the camera optical lens 10 according to the first embodiment of the present application.

The fifth lens L5 has a positive refractive force, and the objective surface of the third lens L3 is convex at a proximal-axis position.

TABLE 1

| | R | d | | nd | | vd | |
|---|---|---|---|---|---|---|---|
| S1 | ∞ | d0= | −0.791 | | | | |
| R1 | 2.137 | d1= | 0.863 | nd1 | 1.4959 | v1 | 81.65 |
| R2 | 6.884 | d2= | 0.307 | | | | |
| R3 | 7.225 | d3= | 0.230 | nd2 | 1.6700 | v2 | 19.39 |
| R4 | 5.473 | d4= | 0.368 | | | | |
| R5 | 57.504 | d5= | 0.408 | nd3 | 1.5444 | v3 | 55.82 |
| R6 | −56.941 | d6= | 0.124 | | | | |
| R7 | 15.028 | d7= | 0.250 | nd4 | 1.6700 | v4 | 19.39 |
| R8 | 8.461 | d8= | 0.413 | | | | |
| R9 | 22.733 | d9= | 0.468 | nd5 | 1.5661 | v5 | 37.71 |
| R10 | 38.146 | d10= | 0.335 | | | | |
| R11 | 2.380 | d11= | 0.499 | nd6 | 1.5444 | v6 | 55.82 |
| R12 | 8.921 | d12= | 0.806 | | | | |
| R13 | −5.667 | d13= | 0.380 | nd7 | 1.5346 | v7 | 55.69 |
| R14 | 2.918 | d14= | 0.400 | | | | |
| R15 | ∞ | d15= | 0.210 | ndg | 1.5168 | vg | 64.17 |
| R16 | ∞ | d16= | 0.318 | | | | |

The meaning of each symbol is as follows.

S1: aperture;

R: central radius of curvature of the optical surface;

R1: central radius of curvature of the objective surface of the first lens L1;

R2: central radius of curvature of the image surface of the first lens L1;

R3: central radius of curvature of the objective surface of the second lens L2;

R4: central radius of curvature of the image surface of the second lens L2;

R5: central radius of curvature of the objective surface of the third lens L3;

R6: central radius of curvature of the image surface of the third lens L3;

R7: central radius of curvature of the objective surface of the fourth lens L4;

R8: central radius of curvature of the image surface of the fourth lens L4;

R9: central radius of curvature of the objective surface of the fifth lens L5;

R10: central radius of curvature of the image surface of the fifth lens L5;

R11: central radius of curvature of the objective surface of the sixth lens L6;

R12: central radius of curvature of the image surface of the sixth lens L6;

R13: central radius of curvature of the objective surface of the seventh lens L7;

R14: central radius of curvature of the image surface of the seventh lens L7;

R15: central radius of curvature of the objective surface of the optical filter GF;

R16: central radius of curvature of the image surface of the optical filter GF;

d: on-axis thickness of the lens, on-axis distance between the lenses;

d0: on-axis distance from the aperture S1 to the objective surface of the first lens L1;

d1: on-axis thickness of the first lens L1;

d2: on-axis distance from the image surface of the first lens L1 to the objective surface of the second lens L2;

d3: on-axis thickness of the second lens L2;

d4: on-axis distance from the image surface of the second lens L2 to the objective surface of the third lens L3;

d5: on-axis thickness of the third lens L3;

d6: on-axis distance from the image surface of the third lens L3 to the objective surface of the fourth lens L4;

d7: on-axis thickness of the fourth lens L4;

d8: on-axis distance from the image surface of the fourth lens L4 to the objective surface of the fifth lens L5;

d9: on-axis thickness of the fifth lens L5;

d10: on-axis distance from the image surface of the fifth lens L5 to the objective surface of the sixth lens L6;

d11: on-axis thickness of the sixth lens L6;

d12: on-axis distance from the image surface of the sixth lens L6 to the objective surface of the seventh lens L7;

d13: on-axis thickness of the seventh lens L7;

d14: on-axis distance from the image surface of the seventh lens L7 to the objective surface of the optical filter GF;

d15: on-axis thickness of the optical filter GF;

d16: on-axis distance from the image surface of the optical filter GF to the image plane Si;

nd: refractive index of the line d (the line d is green light with a wavelength of 550 nm);

nd1: refractive index of the line d of the first lens L1;

nd2: refractive index of the line d of the second lens L2;

nd3: refractive index of the line d of the third lens L3;

nd4: refractive index of the line d of the fourth lens L4;

nd5: refractive index of the line d of the fifth lens L5;

nd6: refractive index of line d of the sixth lens L6;

nd7: refractive index of line d of the seventh lens L7;

ndg: refractive index of line d of the optical filter GF;

vd: Abbe number;

v1: Abbe number of the first lens L1;

v2: Abbe number of the second lens L2;

v3: Abbe number of the third lens L3;

v4: Abbe number of the fourth lens L4;

v5: Abbe number of the fifth lens L5;

v6: Abbe number of the sixth lens L6;

v7: Abbe number of the seventh lens L7;

vg: Abbe number of the optical filter GF.

Table 2 illustrates the aspherical surface data of each lens in the camera optical lens 10 of the first embodiment of the present application.

TABLE 2

| | Cone Coefficient | Asphericity Coefficient | | | | |
| --- | --- | --- | --- | --- | --- | --- |
| | k | A4 | A6 | A8 | A10 | A12 |
| R1 | −1.9795E−01 | −1.0690E−03 | 1.8518E−02 | −5.3501E−02 | 1.0382E−01 | −1.3447E−01 |
| R2 | −4.8366E+01 | 1.3036E−02 | −5.2147E−03 | −4.8920E−03 | 1.4015E−02 | −1.8318E−02 |
| R3 | 1.9329E+01 | −2.8894E−02 | 2.0129E−03 | 2.7851E−02 | −1.1791E−01 | 3.0048E−01 |
| R4 | −2.8764E+01 | 7.2785E−03 | −1.7045E−02 | 8.0623E−02 | −2.5026E−01 | 5.5784E−01 |
| R5 | 3.7805E+01 | −1.1120E−02 | 9.2146E−03 | −1.4575E−01 | 5.4332E−01 | −1.2774E+00 |
| R6 | −7.6400E+02 | −1.9076E−02 | −2.5247E−02 | 8.0707E−02 | −1.9449E−01 | 3.0550E−01 |
| R7 | 3.9551E+01 | −8.8049E−02 | 3.1999E−02 | −3.7026E−02 | 3.3252E−02 | 1.1510E−02 |
| R8 | −5.6902E+01 | −6.9955E−02 | 3.4425E−02 | −3.3503E−02 | 1.4057E−02 | 2.3335E−02 |
| R9 | 9.7301E+01 | −5.9230E−02 | 5.6074E−02 | −7.1800E−02 | 9.1107E−02 | −1.0143E−01 |
| R10 | −1.9188E+02 | −1.3276E−01 | 7.7076E−02 | −2.0424E−02 | −1.9356E−02 | 2.7198E−02 |
| R11 | −1.0474E+01 | 1.7489E−02 | −4.0289E−02 | 3.7451E−02 | −2.5657E−02 | 1.0537E−02 |
| R12 | 3.4267E+00 | 3.6650E−02 | −3.2918E−02 | 3.0454E−02 | −2.2749E−02 | 1.0604E−02 |
| R13 | −6.9418E−02 | −1.5956E−01 | 1.4637E−01 | −8.6556E−02 | 3.8501E−02 | −1.2327E−02 |
| R14 | −3.0137E+01 | −6.4136E−02 | 3.4860E−02 | −1.0938E−02 | 1.5100E−03 | 1.8452E−04 |

| | Cone Coefficient | Asphericity Coefficient | | | | |
| --- | --- | --- | --- | --- | --- | --- |
| | k | A14 | A16 | A18 | A20 | A22 |
| R1 | −1.9795E−01 | 1.1974E−01 | −7.4152E−02 | 3.1812E−02 | −9.2433E−03 | 1.7275E−03 |
| R2 | −4.8366E+01 | 1.7075E−02 | −1.2879E−02 | 7.7418E−03 | −3.3892E−03 | 9.7435E−04 |
| R3 | 1.9329E+01 | −4.8387E−01 | 5.1517E−01 | −3.6816E−01 | 1.7481E−01 | −5.2888E−02 |
| R4 | −2.8764E+01 | −8.5179E−01 | 8.9780E−01 | −6.5039E−01 | 3.1703E−01 | −9.8971E−02 |
| R5 | 3.7805E+01 | 2.0165E+00 | 2.1933E+00 | 1.6472E+00 | −8.3830E−01 | 2.7583E−01 |

TABLE 2-continued

| | | | | | |
|---|---|---|---|---|---|
| R6 | −7.6400E+02 | −3.4640E−01 | 2.8521E−01 | −1.6816E−01 | 6.8857E−02 | −1.8440E−02 |
| R7 | 3.9551E+01 | −9.8642E−02 | 1.5492E−01 | −1.3257E−01 | 6.9310E−02 | −2.2018E−02 |
| R8 | −5.6902E+01 | −5.3778E−02 | 5.3993E−02 | −3.2752E−02 | 1.2693E−02 | −3.0833E−03 |
| R9 | 9.7301E+01 | 8.4093E−02 | −4.8983E−02 | 1.9509E−02 | −5.1686E−03 | 8.6688E−04 |
| R10 | −1.9188E+02 | −1.6203E−02 | 5.6605E−03 | −1.2205E−03 | 1.5968E−04 | −1.1639E−05 |
| R11 | −1.0474E+01 | −2.7429E−03 | 4.8255E−04 | −5.9421E−05 | 5.1694E−06 | −3.1295E−07 |
| R12 | 3.4267E+00 | −3.1853E−03 | 6.4431E−04 | −8.9863E−05 | 8.6763E−06 | −5.7022E−07 |
| R13 | −6.9418E−02 | 2.7912E−03 | −4.5025E−04 | 5.2256E−05 | −4.3774E−06 | 2.6248E−07 |
| R14 | −3.0137E+01 | −1.3268E−04 | 3.0494E−05 | −4.2040E−06 | 3.8619E−07 | −2.4275E−08 |

| | Cone Coefficient | Asphericity Coefficient | | | |
|---|---|---|---|---|---|
| | k | A24 | A26 | A28 | A30 |
| R1 | −1.9795E−01 | −1.8610E−04 | 8.6763E−06 | 0.0000E+00 | 0.0000E+00 |
| R2 | −4.8366E+01 | −1.6151E−04 | 1.1605E−05 | 0.0000E+00 | 0.0000E+00 |
| R3 | 1.9329E+01 | 9.2266E−03 | −7.0627E−04 | 0.0000E+00 | 0.0000E+00 |
| R4 | −2.8764E+01 | 1.7798E−02 | −1.3933E−03 | 0.0000E+00 | 0.0000E+00 |
| R5 | 3.7805E+01 | −5.2901E−02 | 4.4872E−03 | 0.0000E+00 | 0.0000E+00 |
| R6 | −7.6400E+02 | 2.8814E−03 | −1.9856E−04 | 0.0000E+00 | 0.0000E+00 |
| R7 | 3.9551E+01 | 3.9020E−03 | −2.9615E−04 | 0.0000E+00 | 0.0000E+00 |
| R8 | −5.6902E+01 | 4.2850E−04 | −2.5974E−05 | 0.0000E+00 | 0.0000E+00 |
| R9 | 9.7301E+01 | −8.2949E−05 | 3.4380E−06 | 0.0000E+00 | 0.0000E+00 |
| R10 | −1.9188E+02 | 3.6318E−07 | 0.0000E+00 | 0.0000E+00 | 0.0000E+00 |
| R11 | −1.0474E+01 | 1.2586E−08 | −3.0284E−10 | 3.3026E−12 | 0.0000E+00 |
| R12 | 3.4267E+00 | 2.4361E−08 | −6.1023E−10 | 6.8013E−12 | 0.0000E+00 |
| R13 | −6.9418E−02 | −1.0995E−08 | 3.0575E−10 | −5.0738E−12 | 3.8039E−14 |
| R14 | −3.0137E+01 | 1.0350E−09 | −2.8677E−11 | 4.6646E−13 | −3.3828E−15 |

For convenience, the asphericity surfaces of the individual lens surfaces use the asphericity surfaces shown in Equation (1) below. However, the present application is not limited to the polynomial form of the asphericity surfaces expressed in Equation (1).

$$z = \left(cr^2\right)/\left\{1 + \left[1 - (k+1)\left(c^2r^2\right)\right]^{1/2}\right\} + A4r^4 + A6r^6 +$$
$$A8r^8 + A10r^{10} + A12r^{12} + A14r^{14} + A16r^{16} + A18r^{18} +$$
$$A20r^{20} + A22r^{22} + A24r^{24} + A26r^{26} + A28r^{28} + A30r^{30} \tag{1}$$

k is the conic coefficient, A4, A6, A8, A10, A12, A14, A16, A18, A20, A22, A24, A26, A28, A30 are asphericity coefficients; c is a central curvature of the optical surface; r is a perpendicular distance between a point on the aspheric curve and the optical axis, and z is the depth of the asphere (the perpendicular distance between a point on the aspheric surface at a distance of r from the optical axis and the tangent plane tangent to the apex of the aspheric surface on the optical axis).

Figure 3:
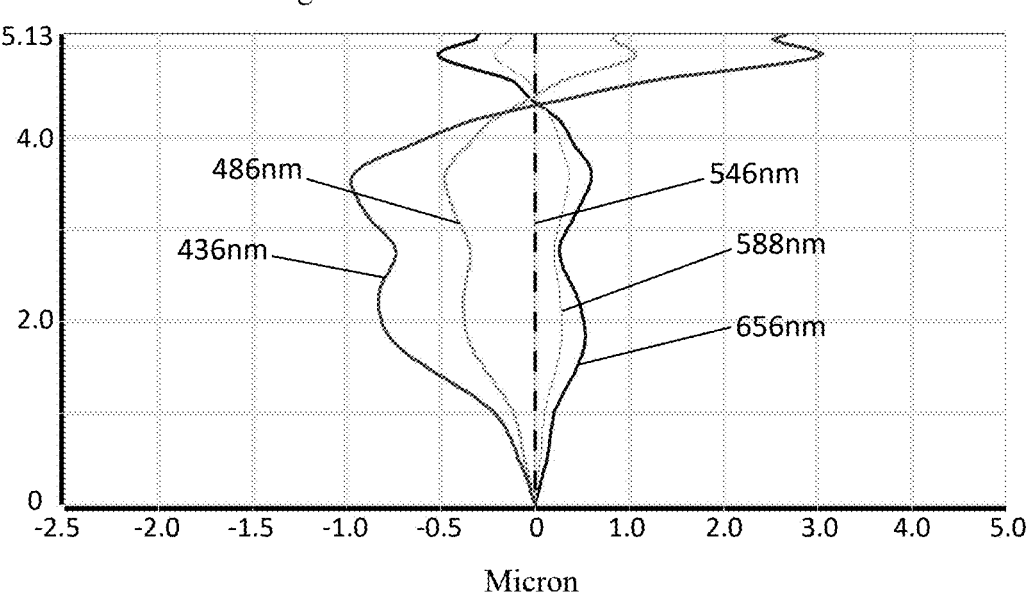
FIG. 3 is a schematic diagram of the magnification chromatic aberration of the camera optical lens shown in FIG. 1.
Figure 4:
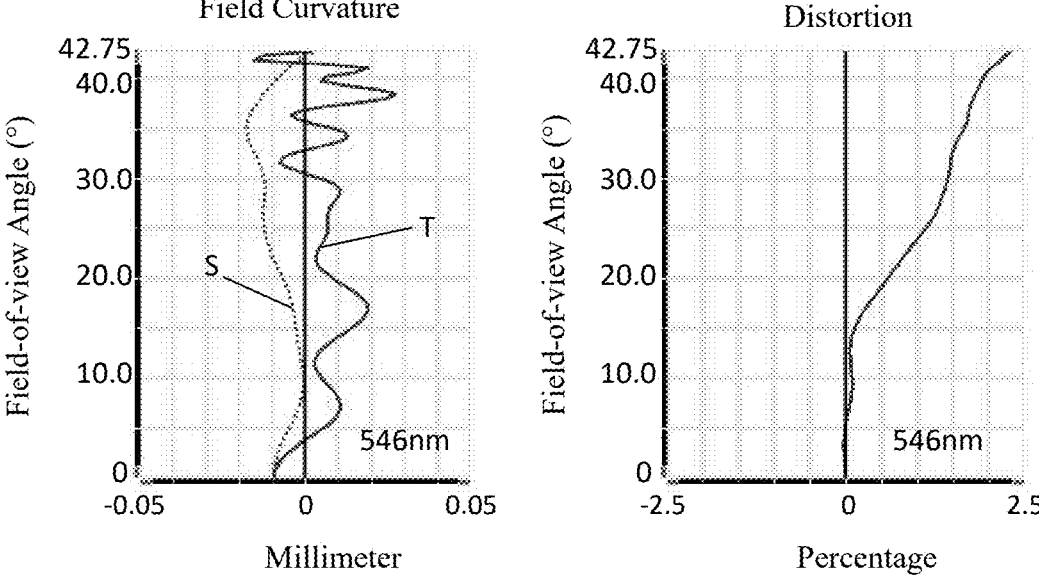
FIG. 4 is a schematic diagram of the field curvature and distortion of the camera optical lens shown in FIG. 1.

FIGS. 2 and 3 illustrate schematic diagrams of the axial aberration and magnification chromatic aberration of light with wavelengths of 656 nm, 588 nm, 546 nm, 486 nm, and 436 nm, respectively, after passing through the camera optical lens 10 of the first embodiment. FIG. 4, on the other hand, illustrates a schematic diagram of the field curvature and distortion of light with a wavelength of 546 nm after passing through the camera optical lens 10 of the first embodiment. The field curvature S of FIG. 4 is the field curvature in the arc-sagittal direction, and Tis the field curvature in the meridional direction.

In this embodiment, the camera optical lens 10 has an Entrance Pupil Diameter (ENPD) of 3.306 mm, a full field of view image height (IH) of 5.125 mm, and a field-of-view angle (FOV) of 85.50° in the diagonal direction. The camera optical lens 10 satisfies the design requirements of a large aperture, a wide angle, and an ultra-thinness, and has excel-lent optical characteristics due to its on-axis and off-axis chromatic aberrations being sufficiently compensated.

Second Embodiment

The symbols of the second embodiment have the same meaning as the first embodiment.

Figure 5:
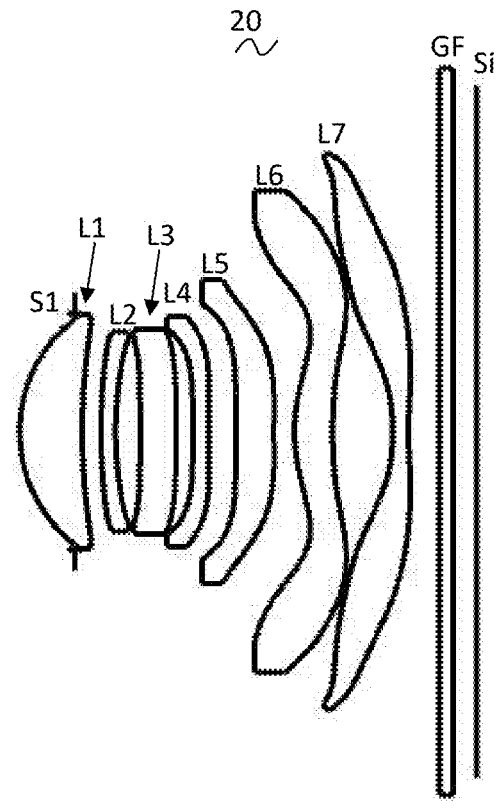
FIG. 5 is a structural schematic diagram of the camera optical lens according to the second embodiment of the present application.

The camera optical lens 20 of the second embodiment of the present application is shown in FIG. 5. The fifth lens L5 has a negative refractive force, and the objective surface of the third lens L3 is concave at a proximal-axis position.

Tables 3 and 4 illustrate the design data of the camera optical lens 20 according to the second embodiment of the present application.

TABLE 3

| | R | d | | nd | | vd |
|---|---|---|---|---|---|---|
| S1 | ∞ | d0= | −0.797 | | | |
| R1 | 2.157 | d1= | 0.907 | nd1 | 1.4959 v1 | 81.65 |
| R2 | 9.434 | d2= | 0.270 | | | |
| R3 | 7.714 | d3= | 0.210 | nd2 | 1.6700 v2 | 19.39 |
| R4 | 5.278 | d4= | 0.355 | | | |
| R5 | −1403.241 | d5= | 0.523 | nd3 | 1.5444 v3 | 55.82 |
| R6 | −49.231 | d6= | 0.235 | | | |
| R7 | 28.368 | d7= | 0.231 | nd4 | 1.6700 v4 | 19.39 |
| R8 | 9.537 | d8= | 0.393 | | | |
| R9 | 21.166 | d9= | 0.555 | nd5 | 1.5661 v5 | 37.71 |
| R10 | 12.717 | d10= | 0.294 | | | |
| R11 | 2.210 | d11= | 0.559 | nd6 | 1.5444 v6 | 55.82 |
| R12 | 8.926 | d12= | 0.863 | | | |
| R13 | −4.337 | d13= | 0.230 | nd7 | 1.5346 v7 | 55.69 |
| R14 | 4.302 | d14= | 0.441 | | | |
| R15 | ∞ | d15= | 0.210 | ndg | 1.5168 vg | 64.17 |
| R16 | ∞ | d16= | 0.337 | | | |

Table 4 illustrates the aspherical surface data for each lens in the camera optical lens 20 according to the second embodiment of the present application.

TABLE 4

| | Cone Coefficient | Asphericity Coefficient | | | | |
|---|---|---|---|---|---|---|
| | k | A4 | A6 | A8 | A10 | A12 |
| R1 | −1.6303E−01 | −2.6317E−03 | 1.9384E−02 | −5.3894E−02 | 1.0387E−01 | −1.3449E−01 |
| R2 | −8.8977E+01 | 1.0549E−02 | −4.1336E−03 | −3.9976E−03 | 1.3617E−02 | −1.8317E−02 |
| R3 | 2.2010E+01 | −2.2173E−02 | 2.0065E−03 | 2.7991E−02 | −1.1872E−01 | 3.0048E−01 |
| R4 | −2.4304E+01 | 8.3574E−03 | −1.6008E−02 | 7.8998E−02 | −2.5080E−01 | 5.5792E−01 |
| R5 | 1.0472E+02 | −1.3673E−02 | 5.3852E−03 | −1.3037E−01 | 5.3072E−01 | −1.2716E+00 |
| R6 | 2.6134E+02 | −1.5990E−02 | −2.1191E−02 | 8.0771E−02 | −1.9237E−01 | 3.0532E−01 |
| R7 | −2.1542E+01 | −7.9809E−02 | 3.0458E−02 | −3.6843E−02 | 3.3729E−02 | 1.1561E−02 |
| R8 | −1.4687E+02 | −6.6956E−02 | 3.5947E−02 | −3.2980E−02 | 1.0551E−02 | 2.5861E−02 |
| R9 | 3.1427E+01 | −6.3568E−02 | 5.4540E−02 | −7.1150E−02 | 9.0956E−02 | −1.0145E−01 |
| R10 | −1.2398E+02 | −1.3528E−01 | 7.4218E−02 | −2.0205E−02 | −1.9331E−02 | 2.7246E−02 |
| R11 | −9.4513E+00 | 1.6668E−02 | −4.0295E−02 | 3.7455E−02 | 2.5657E−02 | 1.0537E−02 |
| R12 | 2.9018E+00 | 3.5201E−02 | −3.2871E−02 | 3.0455E−02 | −2.2747E−02 | 1.0604E−02 |
| R13 | 5.3060E−02 | −1.5732E−01 | 1.4659E−01 | −8.6554E−02 | 3.8499E−02 | −1.2326E−02 |
| R14 | −8.9121E+01 | −6.5290E−02 | 3.4991E−02 | −1.0931E−02 | 1.5114E−03 | 1.8440E−04 |

| | Cone Coefficient | Asphericity Coefficient | | | | |
|---|---|---|---|---|---|---|
| | k | A14 | A16 | A18 | A20 | A22 |
| R1 | −1.6303E−01 | 1.1975E−01 | −7.4152E−02 | 3.1812E−02 | −9.2438E−03 | 1.7275E−03 |
| R2 | −8.8977E+01 | 1.7096E−02 | −1.2881E−02 | 7.7427E−03 | −3.3894E−03 | 9.7442E−04 |
| R3 | 2.2010E+01 | −4.8389E−01 | 5.1536E−01 | −3.6825E−01 | 1.7480E−01 | −5.2880E−02 |
| R4 | −2.4304E+01 | −8.5180E−01 | 8.9781E−01 | −6.5038E−01 | 3.1704E−01 | −9.8989E−02 |
| R5 | 1.0472E+02 | 2.0152E+00 | −2.1931E+00 | 1.6472E+00 | −8.3826E−01 | 2.7582E−01 |
| R6 | 2.6134E+02 | −3.4655E−01 | 2.8519E−01 | −1.6817E−01 | 6.8837E−02 | −1.8434E−02 |
| R7 | −2.1542E+01 | −9.8716E−02 | 1.5488E−01 | −1.3261E−01 | 6.9312E−02 | −2.2020E−02 |
| R8 | −1.4687E+02 | −5.4373E−02 | 5.3901E−02 | −3.2684E−02 | 1.2679E−02 | −3.0816E−03 |
| R9 | 3.1427E+01 | 8.4104E−02 | −4.8980E−02 | 1.9510E−02 | −5.1687E−03 | 8.6683E−04 |
| R10 | −1.2398E+02 | −1.6224E−02 | 5.6637E−03 | −1.2206E−03 | 1.5969E−04 | −1.1640E−05 |
| R11 | −9.4513E+00 | −2.7429E−03 | 4.8255E−04 | −5.9421E−05 | 5.1694E−06 | −3.1295E−07 |
| R12 | 2.9018E+00 | −3.1853E−03 | 6.4431E−04 | −8.9863E−05 | 8.6763E−06 | −5.7022E−07 |
| R13 | 5.3060E−02 | 2.7912E−03 | −4.5025E−04 | 5.2256E−05 | −4.3774E−06 | 2.6248E−07 |
| R14 | −8.9121E+01 | −1.3269E−04 | 3.0495E−05 | −4.2040E−06 | 3.8619E−07 | −2.4275E−08 |

| | Cone Coefficient | Asphericity Coefficient | | | |
|---|---|---|---|---|---|
| | k | A24 | A26 | A28 | A30 |
| R1 | −1.6303E−01 | −1.8606E−04 | 8.6798E−06 | 0.0000E+00 | 0.0000E+00 |
| R2 | −8.8977E+01 | −1.6148E−04 | 1.1587E−05 | 0.0000E+00 | 0.0000E+00 |
| R3 | 2.2010E+01 | 9.2246E−03 | −7.0602E−04 | 0.0000E+00 | 0.0000E+00 |
| R4 | −2.4304E+01 | 1.7799E−02 | −1.3925E−03 | 0.0000E+00 | 0.0000E+00 |
| R5 | 1.0472E+02 | −5.2942E−02 | 4.5040E−03 | 0.0000E+00 | 0.0000E+00 |
| R6 | 2.6134E+02 | 2.8805E−03 | −1.9788E−04 | 0.0000E+00 | 0.0000E+00 |
| R7 | −2.1542E+01 | 3.9125E−03 | −2.9937E−04 | 0.0000E+00 | 0.0000E+00 |
| R8 | −1.4687E+02 | 4.2867E−04 | −2.6051E−05 | 0.0000E+00 | 0.0000E+00 |
| R9 | 3.1427E+01 | −8.2959E−05 | 3.4415E−06 | 0.0000E+00 | 0.0000E+00 |
| R10 | −1.2398E+02 | 3.6298E−07 | 6.6462E−13 | 0.0000E+00 | 0.0000E+00 |
| R11 | −9.4513E+00 | 1.2586E−08 | −3.0284E−10 | 3.3020E−12 | 0.0000E+00 |
| R12 | 2.9018E+00 | 2.4361E−08 | −6.1022E−10 | 6.8007E−12 | 0.0000E+00 |
| R13 | 5.3060E−02 | −1.0995E−08 | 3.0575E−10 | −5.0737E−12 | 3.8040E−14 |
| R14 | −8.9121E+01 | 1.0350E−09 | −2.8679E−11 | 4.6655E−13 | −3.3831E−15 |

Figure 6:
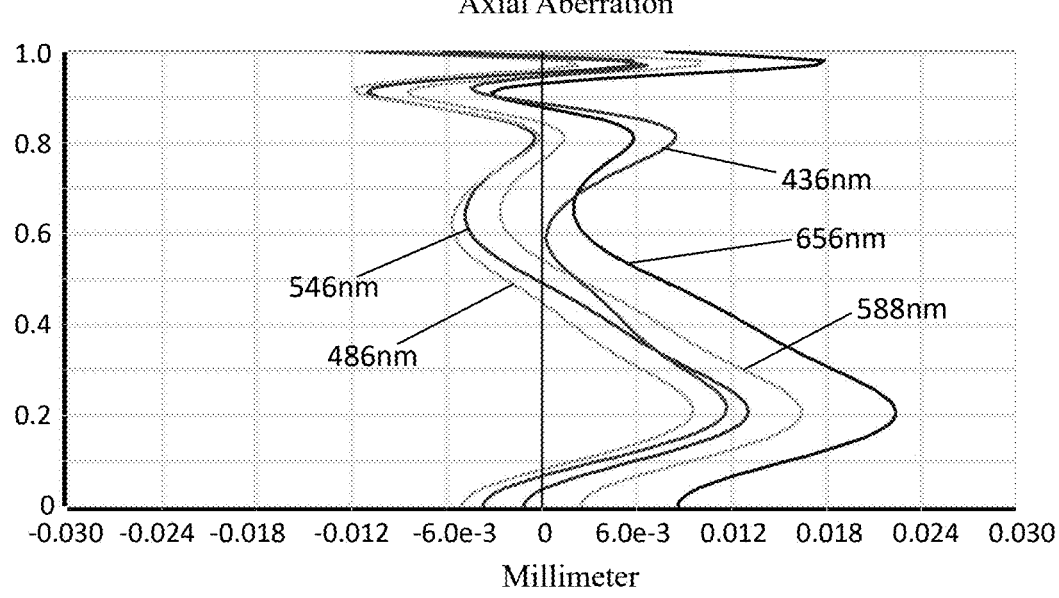
FIG. 6 is a schematic diagram of the axial aberration of the camera optical lens shown in FIG. 5.
Figure 7:
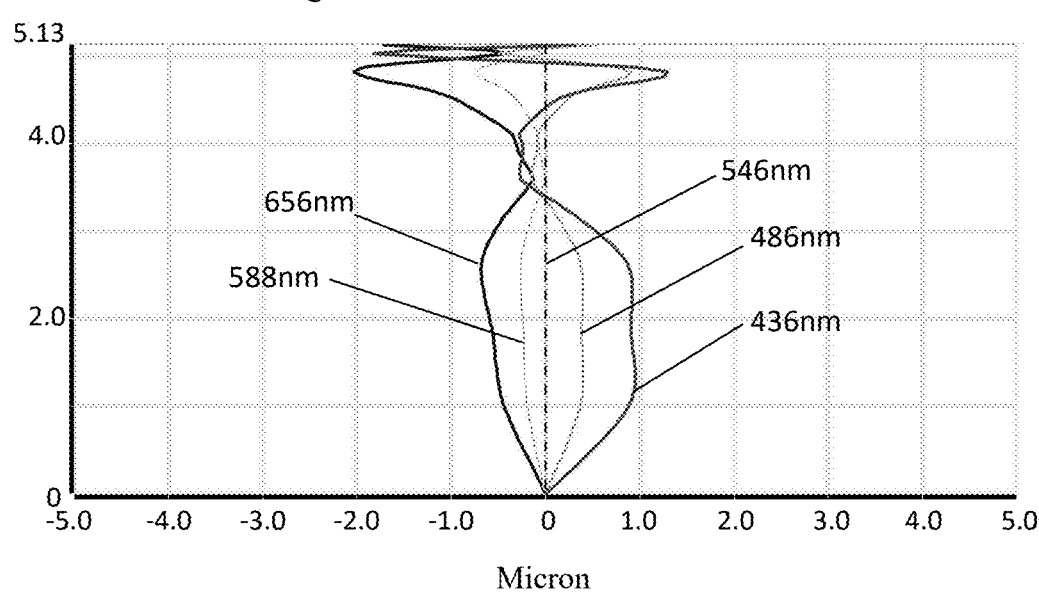
FIG. 7 is a schematic diagram of the magnification chromatic aberration of the camera optical lens shown in FIG. 5.
Figure 8:
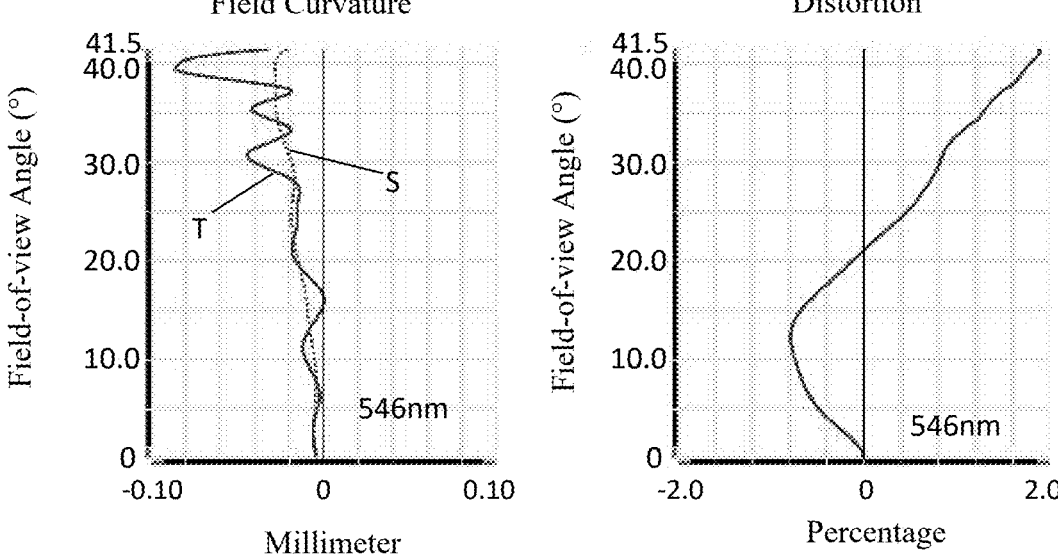
FIG. 8 is a schematic diagram of the field curvature and distortion of the camera optical lens shown in FIG. 5.

FIGS. 6 and 7 illustrates schematic diagrams of the axial aberration and magnification chromatic aberration of light with wavelengths of 656 nm, 588 nm, 546 nm, 486 nm, and 436 nm, respectively, after passing through the camera optical lens 20 of the second embodiment. FIG. 8, on the other hand, illustrates a schematic diagram of the field curvature and distortion of light with a wavelength of 546 nm after passing through the camera optical lens 20 of the second embodiment. The field curvature S of FIG. 8 is the field curvature in the arc-sagittal direction, and Tis the field curvature in the meridional direction.

In this embodiment, the camera optical lens 20 has an ENPD of 3.493 mm, a full field of view image height (IH) of 5.125 mm, and a field-of-view angle (FOV) of 82.98° in the diagonal direction. The camera optical lens 20 satisfies the design requirements of a large aperture, a wide angle, and an ultra-thinness, and has excellent optical characteristics due to its on-axis and off-axis chromatic aberrations being sufficiently compensated.

Third Embodiment

The symbols of the third embodiment have the same meaning as the first embodiment.

Figure 9:
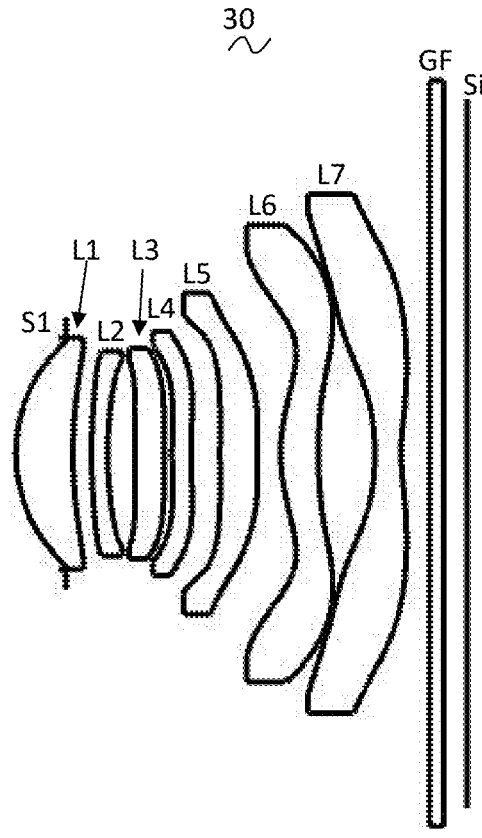
FIG. 9 is a structural schematic diagram of the camera optical lens according to the third embodiment of the present application.

FIG. 9 shows the camera optical lens 30 according to the third embodiment of the present application.

Tables 5 and 6 illustrate the design data of the camera optical lens 30 according to the third embodiment of the present application.

TABLE 5

| | R | d | | nd | | vd | |
|---|---|---|---|---|---|---|---|
| S1 | ∞ | d0= | −0.719 | | | | |
| R1 | 2.167 | d1= | 0.822 | nd1 | 1.5111 | v1 | 60.48 |
| R2 | 6.215 | d2= | 0.271 | | | | |
| R3 | 7.341 | d3= | 0.229 | nd2 | 1.6700 | v2 | 19.39 |
| R4 | 5.400 | d4= | 0.395 | | | | |

TABLE 5-continued

| | R | d | | | nd | | νd |
|---|---|---|---|---|---|---|---|
| R5 | 56.074 | d5= | 0.421 | nd3 | 1.5444 | ν3 | 55.82 |
| R6 | −71.958 | d6= | 0.113 | | | | |
| R7 | 10.562 | d7= | 0.275 | nd4 | 1.6700 | ν4 | 19.39 |
| R8 | 7.558 | d8= | 0.417 | | | | |
| R9 | 23.518 | d9= | 0.542 | nd5 | 1.5661 | ν5 | 37.71 |
| R10 | 40.164 | d10= | 0.331 | | | | |
| R11 | 2.365 | d11= | 0.543 | nd6 | 1.5444 | ν6 | 55.82 |
| R12 | 8.948 | d12= | 0.811 | | | | |
| R13 | −5.445 | d13= | 0.383 | nd7 | 1.5346 | ν7 | 55.69 |
| R14 | 2.906 | d14= | 0.404 | | | | |
| R15 | ∞ | d15= | 0.210 | ndg | 1.5168 | νg | 64.17 |
| R16 | ∞ | d16= | 0.327 | | | | |

Table 6 illustrates the aspherical data for each lens in the camera optical lens 30 according to the third embodiment of the present application.

Figure 10:
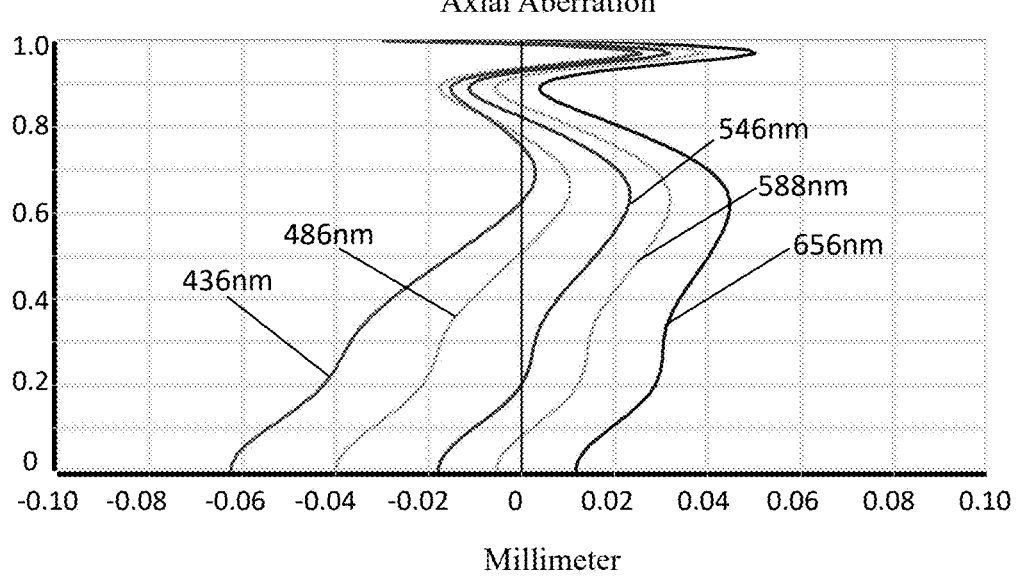
FIG. 10 is a schematic diagram of the axial aberration of the camera optical lens shown in FIG. 9.
Figure 11:
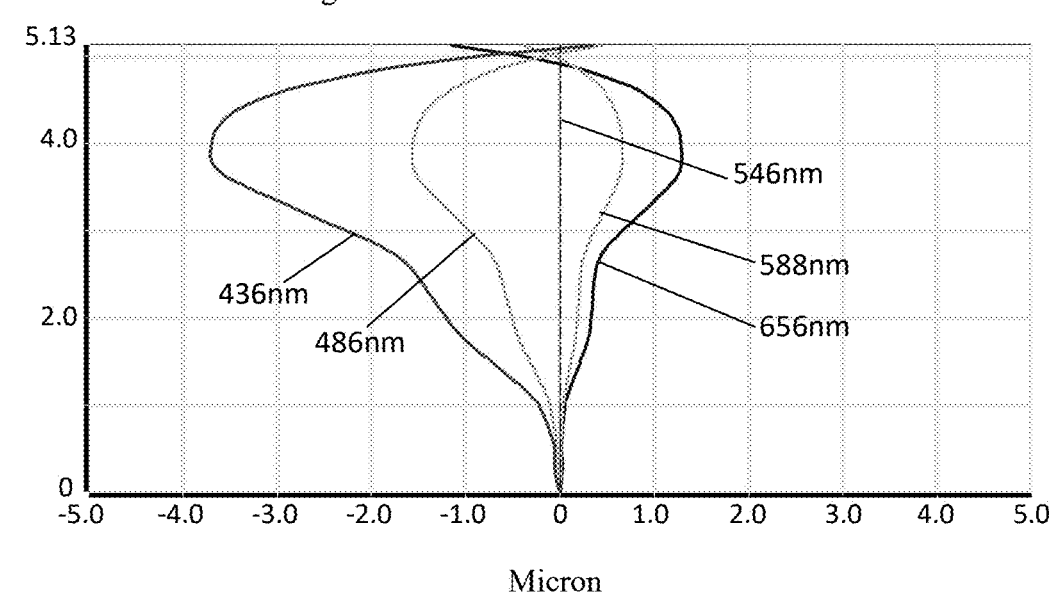
FIG. 11 is a schematic diagram of the magnification chromatic aberration of the camera optical lens shown in FIG. 9.
Figure 12:
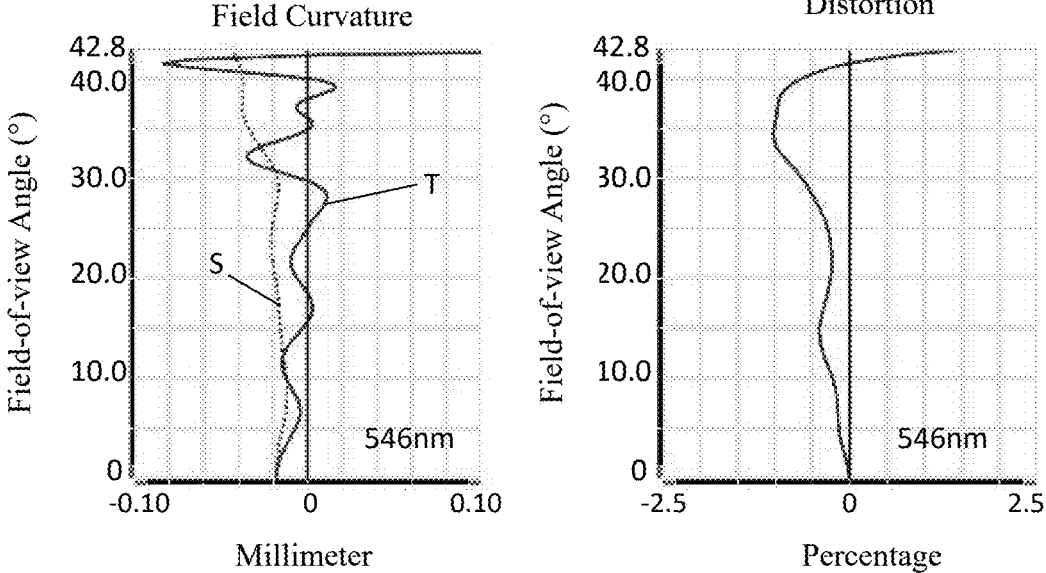
FIG. 12 is a schematic diagram of the field curvature and distortion of the camera optical lens shown in FIG. 9.

FIGS. 10 and 11 illustrate the axial aberration and magnification chromatic aberration of light with wavelengths of 656 nm, 588 nm, 546 nm, 486 nm, and 436 nm, respectively, after passing through the camera optical lens 30 of the third embodiment. FIG. 12, on the other hand, illustrates a schematic diagram of the field curvature and distortion of light with a wavelength of 546 nm after passing through the camera optical lens 30 of the third embodiment. The field curvature S of FIG. 12 is the field curvature in the arc-sagittal direction, and T is the field curvature in the meridional direction.

In this embodiment, the camera optical lens 30 has an ENPD of 3.322 mm, a full field of view image height (IH) of 5.125 mm, and a field-of-view angle (FOV) of 85.57° in the diagonal direction. The camera optical lens 30 satisfies the design requirements of a large aperture, a wide angle, and an ultra-thinness, and has excellent optical characteris-

TABLE 6

| | Cone Coefficient | Asphericity Coefficient | | | | |
|---|---|---|---|---|---|---|
| | k | A4 | A6 | A8 | A10 | A12 |
| R1 | −1.8747E−01 | −1.7284E−03 | 1.8561E−02 | −5.3468E−02 | 1.0383E−01 | −1.3447E−01 |
| R2 | −4.5458E+01 | 1.3288E−02 | −5.3975E−03 | −4.9023E−03 | 1.4008E−02 | −1.8316E−02 |
| R3 | 1.9500E+01 | −2.9709E−02 | 1.8257E−03 | 2.7828E−02 | −1.1790E−01 | 3.0048E−01 |
| R4 | −2.6559E+01 | 9.1026E−03 | −1.6388E−02 | 8.0620E−02 | −2.5025E−01 | 5.5784E−01 |
| R5 | 4.0139E+02 | −9.8708E−03 | 1.0159E−02 | −1.4557E−01 | 5.4323E−01 | −1.2774E+00 |
| R6 | −2.2033E+02 | −1.8938E−02 | −2.5474E−02 | 8.0796E−02 | −1.9445E−01 | 3.0553E−01 |
| R7 | 3.7826E+01 | −8.9732E−02 | 3.2062E−02 | −3.6951E−02 | 3.3287E−02 | 1.1510E−02 |
| R8 | −5.0371E+01 | −6.9407E−02 | 3.4311E−02 | −3.3591E−02 | 1.4029E−02 | 2.3327E−02 |
| R9 | 1.1304E+02 | −5.9647E−02 | 5.5917E−02 | −7.1830E−02 | 9.1107E−02 | −1.0143E−01 |
| R10 | −2.4988E+02 | −1.3305E−01 | 7.6984E−02 | −2.0429E−02 | −1.9356E−02 | 2.7197E−02 |
| R11 | −1.0542E+01 | 1.7568E−02 | −4.0284E−02 | 3.7452E−02 | −2.5657E−02 | 1.0537E−02 |
| R12 | 3.3671E+00 | 3.6501E−02 | −3.2915E−02 | 3.0453E−02 | −2.2749E−02 | 1.0604E−02 |
| R13 | −4.2849E−02 | −1.5983E−01 | 1.4636E−01 | −8.6556E−02 | 3.8501E−02 | −1.2327E−02 |
| R14 | −3.1927E+01 | −6.4216E−02 | 3.4864E−02 | −1.0938E−02 | 1.5100E−03 | 1.8452E−04 |

| | Cone Coefficient | Asphericity Coefficient | | | | |
|---|---|---|---|---|---|---|
| | k | A14 | A16 | A18 | A20 | A22 |
| R1 | −1.8747E−01 | 1.1974E−01 | −7.4152E−02 | 3.1812E−02 | −9.2434E−03 | 1.7275E−03 |
| R2 | −4.5458E+01 | 1.7075E−02 | −1.2879E−02 | 7.7421E−03 | −3.3892E−03 | 9.7436E−04 |
| R3 | 1.9500E+01 | −4.8387E−01 | 5.1517E−01 | −3.6816E−01 | 1.7481E−01 | −5.2889E−02 |
| R4 | −2.6559E+01 | −8.5177E−01 | 8.9780E−01 | −6.5039E−01 | 3.1703E−01 | −9.8972E−02 |
| R5 | 4.0139E+02 | 2.0165E+00 | −2.1933E+00 | 1.6472E+00 | −8.3831E−01 | 2.7583E−01 |
| R6 | −2.2033E+02 | −3.4640E−01 | 2.8521E−01 | −1.6816E−01 | 6.8857E−02 | −1.8440E−02 |
| R7 | 3.7826E+01 | −9.8646E−02 | 1.5491E−01 | −1.3257E−01 | 6.9310E−02 | −2.2018E−02 |
| R8 | −5.0371E+01 | −5.3778E−02 | 5.3992E−02 | −3.2752E−02 | 1.2693E−02 | −3.0833E−03 |
| R9 | 1.1304E+02 | 8.4093E−02 | −4.8983E−02 | 1.9509E−02 | −5.1686E−03 | 8.6688E−04 |
| R10 | −2.4988E+02 | −1.6203E−02 | 5.6605E−03 | −1.2205E−03 | 1.5968E−04 | −1.1639E−05 |
| R11 | −1.0542E+01 | −2.7429E−03 | 4.8255E−04 | −5.9421E−05 | 5.1694E−06 | −3.1295E−07 |
| R12 | 3.3671E+00 | −3.1853E−03 | 6.4431E−04 | −8.9863E−05 | 8.6763E−06 | −5.7022E−07 |
| R13 | −4.2849E−02 | 2.7912E−03 | −4.5025E−04 | 5.2256E−05 | −4.3774E−06 | 2.6248E−07 |
| R14 | −3.1927E+01 | −1.3268E−04 | 3.0494E−05 | −4.2040E−06 | 3.8619E−07 | −2.4275E−08 |

| | Cone Coefficient | Asphericity Coefficient | | | |
|---|---|---|---|---|---|
| | k | A24 | A26 | A28 | A30 |
| R1 | −1.8747E−01 | −1.8610E−04 | 8.6756E−06 | 3.6350E−10 | 5.7932E−11 |
| R2 | −4.5458E+01 | −1.6150E−04 | 1.1604E−05 | −1.8368E−09 | −1.0563E−09 |
| R3 | 1.9500E+01 | 9.2264E−03 | −7.0631E−04 | −7.0119E−10 | 4.2615E−09 |
| R4 | −2.6559E+01 | 1.7798E−02 | −1.3938E−03 | −3.9077E−08 | −4.9115E−08 |
| R5 | 4.0139E+02 | −5.2900E−02 | 4.4881E−03 | −2.8104E−08 | −1.1779E−08 |
| R6 | −2.2033E+02 | 2.8813E−03 | −1.9859E−04 | −6.0572E−10 | −2.0678E−09 |
| R7 | 3.7826E+01 | 3.9019E−03 | −2.9614E−04 | 2.3048E−09 | 6.0636E−09 |
| R8 | −5.0371E+01 | 4.2850E−04 | −2.5973E−05 | 6.3203E−10 | 1.3654E−10 |
| R9 | 1.1304E+02 | −8.2949E−05 | 3.4381E−06 | 2.1848E−12 | −1.9253E−12 |
| R10 | −2.4988E+02 | 3.6318E−07 | 1.4227E−12 | 1.8579E−13 | 4.2012E−14 |
| R11 | −1.0542E+01 | 1.2586E−08 | −3.0284E−10 | 3.3026E−12 | −3.5403E−18 |
| R12 | 3.3671E+00 | 2.4361E−08 | −6.1023E−10 | 6.8013E−12 | −4.1811E−19 |
| R13 | −4.2849E−02 | −1.0995E−08 | 3.0575E−10 | −5.0738E−12 | 3.8039E−14 |
| R14 | −3.1927E+01 | 1.0350E−09 | −2.8677E−11 | 4.6646E−13 | −3.3828E−15 | tics due to its on-axis and off-axis chromatic aberrations being sufficiently compensated.

Fourth Embodiment

The symbols of the fourth embodiment have the same meaning as the first embodiment.

Figure 13:
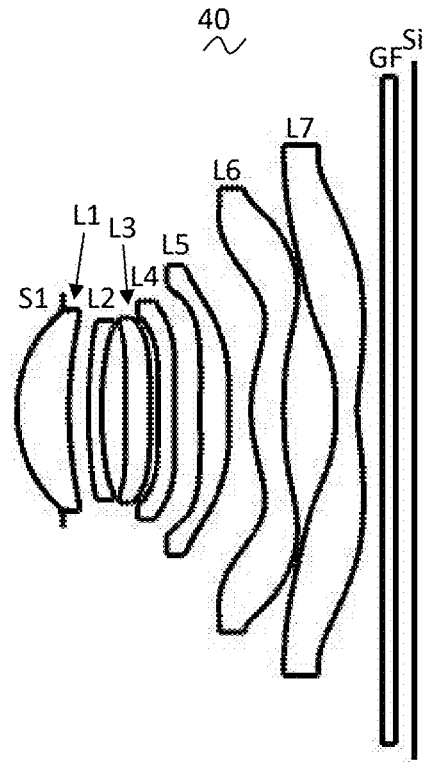
FIG. 13 is a structural schematic diagram of the camera optical lens according to the fourth embodiment of the present application.

FIG. 13 shows the camera optical lens 40 according to the fourth embodiment of the present application.

Tables 7 and 8 illustrate the design data of the camera optical lens 40 according to the fourth embodiment of the present application.

TABLE 7

|  | R | d |  | nd |  | vd |
|---|---|---|---|---|---|---|
| S1 | ∞ | d0= | −0.742 |  |  |  |
| R1 | 2.167 | d1= | 0.828 | nd1 | 1.4959 v1 | 81.65 |
| R2 | 6.327 | d2= | 0.303 |  |  |  |

TABLE 7-continued

|  | R | d |  | nd |  | vd |
|---|---|---|---|---|---|---|
| R3 | 7.008 | d3= | 0.211 | nd2 | 1.6700 v2 | 19.39 |
| R4 | 5.535 | d4= | 0.370 |  |  |  |
| R5 | 38.325 | d5= | 0.393 | nd3 | 1.5444 v3 | 55.82 |
| R6 | −40.349 | d6= | 0.135 |  |  |  |
| R7 | 15.282 | d7= | 0.246 | nd4 | 1.6700 v4 | 19.39 |
| R8 | 8.546 | d8= | 0.414 |  |  |  |
| R9 | 21.180 | d9= | 0.459 | nd5 | 1.5661 v5 | 37.71 |
| R10 | 44.560 | d10= | 0.344 |  |  |  |
| R11 | 2.315 | d11= | 0.523 | nd6 | 1.5444 v6 | 55.82 |
| R12 | 9.014 | d12= | 0.818 |  |  |  |
| R13 | −5.871 | d13= | 0.343 | nd7 | 1.5346 v7 | 55.69 |
| R14 | 2.605 | d14= | 0.400 |  |  |  |
| R15 | ∞ | d15= | 0.210 | ndg | 1.5168 vg | 64.17 |
| R16 | ∞ | d16= | 0.299 |  |  |  |

Table 8 illustrates the aspherical data for each lens in the camera optical lens 40 according to the fourth embodiment of the present application.

TABLE 8

| | Cone Coefficient | Asphericity Coefficient | | | | |
|---|---|---|---|---|---|---|
| | k | A4 | A6 | A8 | A10 | A12 |
| R1 | −2.0704E−01 | −5.4470E−04 | 1.8608E−02 | −5.3500E−02 | 1.0382E−01 | −1.3447E−01 |
| R2 | −4.2844E+01 | 1.3730E−02 | −4.9362E−03 | −4.7482E−03 | 1.4033E−02 | −1.8318E−02 |
| R3 | 1.9405E+01 | −2.9024E−02 | 1.7499E−03 | 2.7813E−02 | −1.1801E−01 | 3.0046E−01 |
| R4 | −2.4929E+01 | 7.5259E−03 | −1.7128E−02 | 8.0544E−02 | −2.5020E−01 | 5.5786E−01 |
| R5 | 3.8960E+01 | −1.0476E−02 | 9.9780E−03 | −1.4611E−01 | 5.4337E−01 | −1.2774E+00 |
| R6 | −9.4511E+02 | −2.2141E−02 | −2.5449E−02 | 8.0666E−02 | −1.9455E−01 | 3.0550E−01 |
| R7 | 4.6637E+01 | −8.9249E−02 | 3.2122E−02 | −3.6918E−02 | 3.3275E−02 | 1.1521E−02 |
| R8 | −4.5816E+01 | −6.9265E−02 | 3.4474E−02 | −3.3454E−02 | 1.4057E−02 | 2.3329E−02 |
| R9 | 1.0050E+02 | −5.8445E−02 | 5.6251E−02 | −7.1745E−02 | 9.1109E−02 | −1.0143E−01 |
| R10 | −1.4589E+03 | −1.3315E−01 | 7.7118E−02 | −2.0431E−02 | −1.9356E−02 | 2.7197E−02 |
| R11 | −1.0493E+01 | 1.7610E−02 | −4.0283E−02 | 3.7451E−02 | −2.5657E−02 | 1.0537E−02 |
| R12 | 3.4850E+00 | 3.7101E−02 | −3.2964E−02 | 3.0452E−02 | −2.2749E−02 | 1.0604E−02 |
| R13 | −8.0992E−02 | −1.5974E−01 | 1.4638E−01 | −8.6556E−02 | 3.8501E−02 | −1.2327E−02 |
| R14 | −2.6404E+01 | −6.3529E−02 | 3.4852E−02 | −1.0938E−02 | 1.5100E−03 | 1.8452E−04 |

| | Cone Coefficient | Asphericity Coefficient | | | | |
|---|---|---|---|---|---|---|
| | k | A14 | A16 | A18 | A20 | A22 |
| R1 | −2.0704E−01 | 1.1974E−01 | −7.4151E−02 | 3.1813E−02 | −9.2432E−03 | 1.7275E−03 |
| R2 | −4.2844E+01 | 1.7076E−02 | −1.2880E−02 | 7.7415E−03 | −3.3892E−03 | 9.7439E−04 |
| R3 | 1.9405E+01 | −4.8390E−01 | 5.1516E−01 | −3.6816E−01 | 1.7481E−01 | −5.2889E−02 |
| R4 | −2.4929E+01 | −8.5180E−01 | 8.9781E−01 | −6.5039E−01 | 3.1702E−01 | −9.8972E−02 |
| R5 | 3.8960E+01 | 2.0165E+00 | −2.1933E+00 | 1.6472E+00 | −8.3831E−01 | 2.7583E−01 |
| R6 | −9.4511E+02 | −3.4641E−01 | 2.8520E−01 | −1.6816E−01 | 6.8856E−02 | −1.8440E−02 |
| R7 | 4.6637E+01 | −9.8642E−02 | 1.5491E−01 | −1.3256E−01 | 6.9309E−02 | −2.2018E−02 |
| R8 | −4.5816E+01 | −5.3780E−02 | 5.3993E−02 | −3.2752E−02 | 1.2693E−02 | −3.0833E−03 |
| R9 | 1.0050E+02 | 8.4092E−02 | −4.8983E−02 | 1.9509E−02 | −5.1686E−03 | 8.6688E−04 |
| R10 | −1.4589E+03 | −1.6203E−02 | 5.6605E−03 | −1.2205E−03 | 1.5968E−04 | −1.1639E−05 |
| R11 | −1.0493E+01 | −2.7429E−03 | 4.8255E−04 | −5.9421E−05 | 5.1694E−06 | −3.1295E−07 |
| R12 | 3.4850E+00 | −3.1853E−03 | 6.4431E−04 | −8.9863E−05 | 8.6763E−06 | −5.7022E−07 |
| R13 | −8.0992E−02 | 2.7912E−03 | −4.5025E−04 | 5.2256E−05 | −4.3774E−06 | 2.6248E−07 |
| R14 | −2.6404E+01 | −1.3268E−04 | 3.0494E−05 | −4.2040E−06 | 3.8619E−07 | −2.4275E−08 |

| | Cone Coefficient | Asphericity Coefficient | | | |
|---|---|---|---|---|---|
| | k | A24 | A26 | A28 | A30 |
| R1 | −2.0704E−01 | −1.8609E−04 | 8.6683E−06 | 0.0000E+00 | 0.0000E+00 |
| R2 | −4.2844E+01 | −1.6153E−04 | 1.1603E−05 | 0.0000E+00 | 0.0000E+00 |
| R3 | 1.9405E+01 | 9.2266E−03 | −7.0649E−04 | 0.0000E+00 | 0.0000E+00 |
| R4 | −2.4929E+01 | 1.7797E−02 | −1.3937E−03 | 0.0000E+00 | 0.0000E+00 |
| R5 | 3.8960E+01 | −5.2902E−02 | 4.4864E−03 | 0.0000E+00 | 0.0000E+00 |
| R6 | −9.4511E+02 | 2.8809E−03 | −1.9869E−04 | 0.0000E+00 | 0.0000E+00 |
| R7 | 4.6637E+01 | 3.9018E−03 | −2.9620E−04 | 0.0000E+00 | 0.0000E+00 |
| R8 | −4.5816E+01 | 4.2849E−04 | −2.5976E−05 | 0.0000E+00 | 0.0000E+00 |
| R9 | 1.0050E+02 | −8.2950E−05 | 3.4380E−06 | 0.0000E+00 | 0.0000E+00 |
| R10 | −1.4589E+03 | 3.6317E−07 | 1.8262E−12 | 0.0000E+00 | 0.0000E+00 |
| R11 | −1.0493E+01 | 1.2586E−08 | −3.0284E−10 | 3.3026E−12 | 0.0000E+00 |
| R12 | 3.4850E+00 | 2.4361E−08 | −6.1023E−10 | 6.8013E−12 | 0.0000E+00 |

TABLE 8-continued

| | | | | |
|---|---|---|---|---|
| R13 | −8.0992E−02 | −1.0995E−08 | 3.0575E−10 | −5.0738E−12 | 3.8039E−14 |
| R14 | −2.6404E+01 | 1.0350E−09 | −2.8677E−11 | 4.6646E−13 | −3.3828E−15 |

Figure 14:
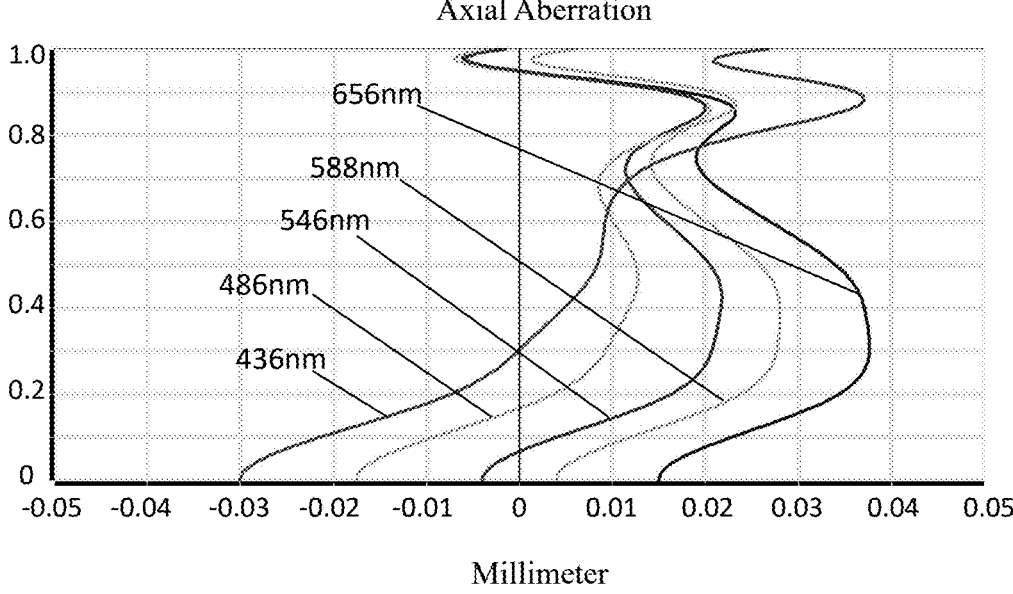
FIG. 14 is a schematic diagram of the axial aberration of the camera optical lens shown in FIG. 13.
Figure 15:
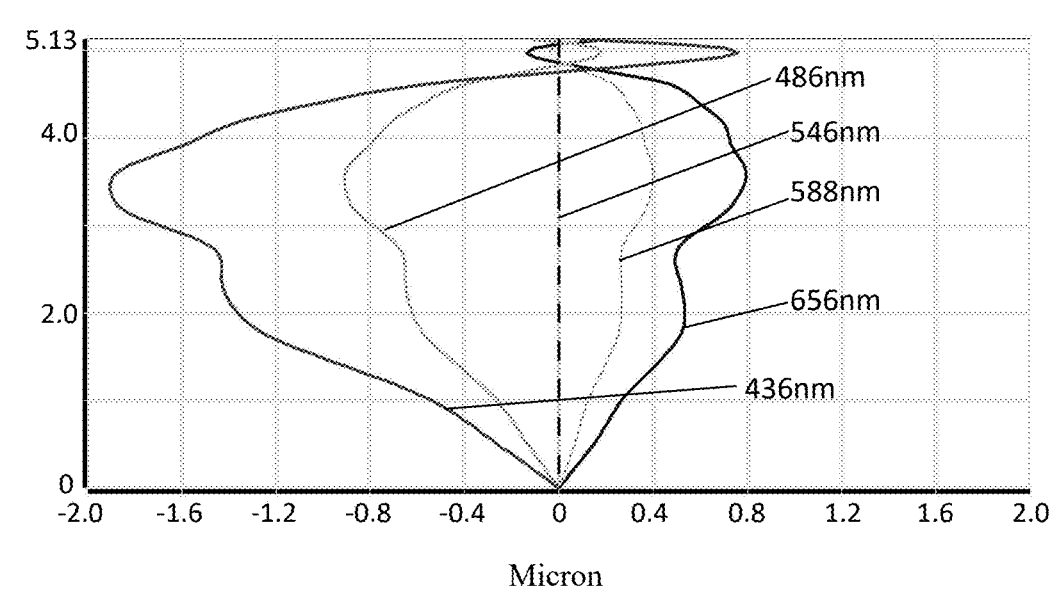
FIG. 15 is a schematic diagram of the magnification chromatic aberration of the camera optical lens shown in FIG. 13.
Figure 16:
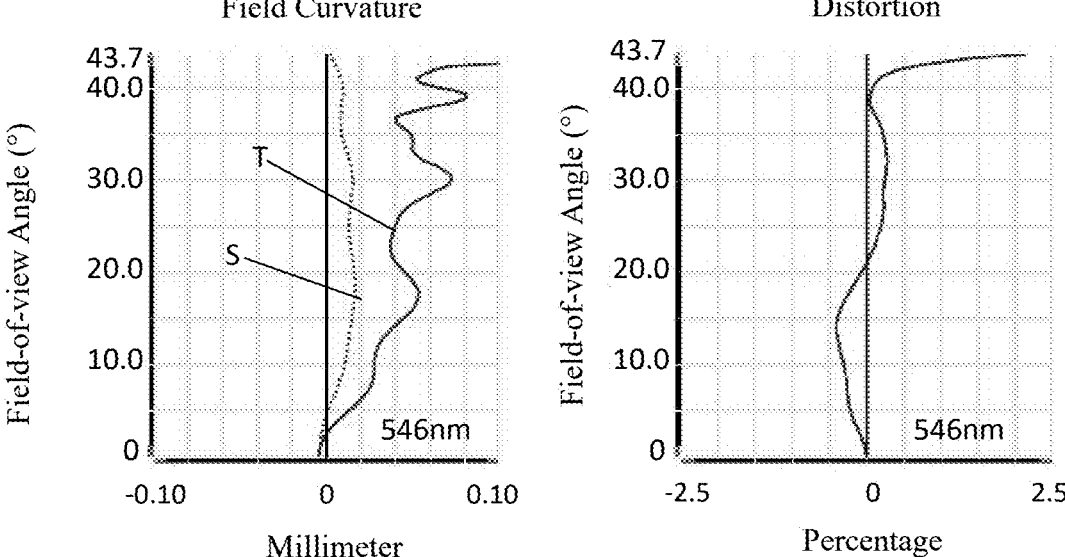
FIG. 16 is a schematic diagram of the field curvature and distortion of the camera optical lens shown in FIG. 13.

FIGS. 14 and 15 illustrates schematic diagrams of the axial aberration and magnification chromatic aberration of light with wavelengths of 656 nm, 588 nm, 546 nm, 486 nm, and 436 nm, respectively, after passing through the camera optical lens 40 of the fourth embodiment. FIG. 16, on the other hand, illustrates a schematic diagram of the field curvature and distortion of light having a wavelength of 546 nm after passing through the camera optical lens 40 of the fourth embodiment. The field curvature S of FIG. 16 is the field curvature in the arc-sagittal direction, and T is the field curvature in the meridional direction.

In this embodiment, the camera optical lens 40 has an incident pupil diameter ENPD of 3.213 mm, a full field of view image height (IH) of 5.125 mm, and a field-of-view angle (FOV) of 87.41° in the diagonal direction. The camera optical lens 40 satisfies the design requirements of a large aperture, a wide angle, and an ultra-thinness, and has excellent optical characteristics due to its on-axis and off-axis chromatic aberrations being sufficiently compensated.

Fifth Embodiment

The symbols of the fifth embodiment have the same meaning as the first embodiment.

Figure 17:
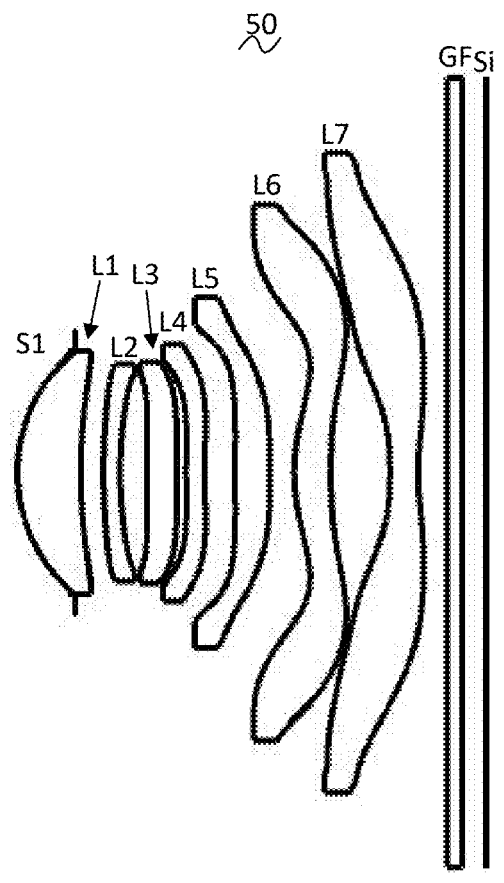
FIG. 17 is a structural schematic diagram of the camera optical lens according to the fifth embodiment of the present application.

FIG. 17 shows the camera optical lens 50 according to the fifth embodiment of the present application.

Tables 9 and 10 illustrate the design data of the camera optical lens 50 according to the fifth embodiment of the present application.

TABLE 9

| | R | d | | nd | | vd |
|---|---|---|---|---|---|---|
| S1 | ∞ | d0= | −0.810 | | | |
| R1 | 2.126 | d1= | 0.879 | nd1 | 1.4959 | v1 | 81.65 |
| R2 | 7.274 | d2= | 0.279 | | | |
| R3 | 7.343 | d3= | 0.173 | nd2 | 1.6700 | v2 | 19.39 |
| R4 | 5.296 | d4= | 0.365 | | | |
| R5 | 82.961 | d5= | 0.451 | nd3 | 1.5444 | v3 | 55.82 |
| R6 | −51.020 | d6= | 0.073 | | | |
| R7 | 10.996 | d7= | 0.204 | nd4 | 1.6700 | v4 | 19.39 |
| R8 | 9.950 | d8= | 0.508 | | | |
| R9 | 40.067 | d9= | 0.484 | nd5 | 1.5661 | v5 | 37.71 |
| R10 | 21.257 | d10= | 0.347 | | | |
| R11 | 2.450 | d11= | 0.486 | nd6 | 1.5444 | v6 | 55.82 |
| R12 | 8.635 | d12= | 0.782 | | | |
| R13 | −6.731 | d13= | 0.402 | nd7 | 1.5346 | v7 | 55.69 |
| R14 | 2.696 | d14= | 0.387 | | | |
| R15 | ∞ | d15= | 0.210 | ndg | 1.5168 | vg | 64.17 |
| R16 | ∞ | d16= | 0.309 | | | |

Table 10 illustrates the aspherical data for each lens in the camera optical lens 50 according to the fifth embodiment of the present application.

TABLE 10

| | Cone Coefficient | Asphericity Coefficient | | | | |
|---|---|---|---|---|---|---|
| | k | A4 | A6 | A8 | A10 | A12 |
| R1 | −2.0031E−01 | −1.4232E−03 | 1.9113E−02 | −5.3640E−02 | 1.0380E−01 | −1.3448E−01 |
| R2 | −6.2390E+01 | 1.3464E−02 | −5.3049E−03 | −4.9134E−03 | 1.3995E−02 | −1.8308E−02 |
| R3 | 2.0434E+01 | −2.9267E−02 | 2.8996E−03 | 2.7917E−02 | −1.1755E−01 | 3.0046E−01 |
| R4 | −2.4058E+01 | 8.5026E−03 | −1.6426E−02 | 8.1247E−02 | −2.5009E−01 | 5.5789E−01 |
| R5 | −1.7016E+03 | −8.9394E−03 | 1.0297E−02 | −1.4558E−01 | 5.4299E−01 | −1.2775E+00 |
| R6 | 1.1030E+03 | −2.3820E−02 | −2.2890E−02 | 8.1362E−02 | −1.9435E−01 | 3.0549E−01 |
| R7 | 4.6815E+01 | −9.0235E−02 | 3.2393E−02 | −3.6840E−02 | 3.3369E−02 | 1.1548E−02 |
| R8 | −3.5152E+01 | −6.9384E−02 | 3.3829E−02 | −3.3368E−02 | 1.4075E−02 | 2.3332E−02 |
| R9 | 2.1549E+02 | −6.2108E−02 | 5.6394E−02 | −7.1898E−02 | 9.1027E−02 | −1.0145E−01 |
| R10 | −9.8425E+01 | −1.3107E−01 | 7.6838E−02 | −2.0390E−02 | −1.9366E−02 | 2.7198E−02 |
| R11 | −1.0663E+01 | 1.7333E−02 | −4.0264E−02 | 3.7451E−02 | −2.5657E−02 | 1.0537E−02 |
| R12 | 3.0173E+00 | 3.7175E−02 | −3.2953E−02 | 3.0451E−02 | −2.2749E−02 | 1.0604E−02 |
| R13 | 3.8317E−01 | −1.6051E−01 | 1.4638E−01 | −8.6555E−02 | 3.8501E−02 | −1.2327E−02 |
| R14 | −2.5461E+01 | −6.3793E−02 | 3.4820E−02 | −1.0936E−02 | 1.5100E−03 | 1.8452E−04 |

| | Cone Coefficient | Asphericity Coefficient | | | | |
|---|---|---|---|---|---|---|
| | k | A14 | A16 | A18 | A20 | A22 |
| R1 | −2.0031E−01 | 1.1973E−01 | −7.4146E−02 | 3.1812E−02 | −9.2433E−03 | 1.7273E−03 |
| R2 | −6.2390E+01 | 1.7083E−02 | −1.2874E−02 | 7.7413E−03 | −3.3892E−03 | 9.7418E−04 |
| R3 | 2.0434E+01 | −4.8390E−01 | 5.1517E−01 | −3.6817E−01 | 1.7481E−01 | −5.2888E−02 |
| R4 | −2.4058E+01 | −8.5183E−01 | 8.9779E−01 | −6.5037E−01 | 3.1702E−01 | −9.8980E−02 |
| R5 | −1.7016E+03 | 2.0165E+00 | −2.1933E+00 | 1.6472E+00 | −8.3827E−01 | 2.7581E−01 |
| R6 | 1.1030E+03 | −3.4640E−01 | 2.8519E−01 | −1.6815E−01 | 6.8857E−02 | −1.8442E−02 |
| R7 | 4.6815E+01 | −9.8638E−02 | 1.5490E−01 | −1.3257E−01 | 6.9309E−02 | −2.2019E−02 |
| R8 | −3.5152E+01 | −5.3783E−02 | 5.3989E−02 | −3.2753E−02 | 1.2692E−02 | −3.0835E−03 |
| R9 | 2.1549E+02 | 8.4089E−02 | −4.8986E−02 | 1.9509E−02 | −5.1687E−03 | 8.6691E−04 |
| R10 | −9.8425E+01 | −1.6203E−02 | 5.6606E−03 | −1.2205E−03 | 1.5968E−04 | −1.1639E−05 |
| R11 | −1.0663E+01 | −2.7429E−03 | 4.8255E−04 | −5.9421E−05 | 5.1694E−06 | −3.1295E−07 |
| R12 | 3.0173E+00 | −3.1853E−03 | 6.4431E−04 | −8.9863E−05 | 8.6763E−06 | −5.7022E−07 |
| R13 | 3.8317E−01 | 2.7912E−03 | −4.5025E−04 | 5.2256E−05 | −4.3774E−06 | 2.6248E−07 |
| R14 | −2.5461E+01 | −1.3268E−04 | 3.0494E−05 | −4.2040E−06 | 3.8619E−07 | −2.4275E−08 |

TABLE 10-continued

| | Cone Coefficient | Asphericity Coefficient | | | |
|---|---|---|---|---|---|
| | k | A24 | A26 | A28 | A30 |
| R1 | −2.0031E−01 | −1.8607E−04 | 8.6792E−06 | 0.0000E+00 | 0.0000E+00 |
| R2 | −6.2390E+01 | −1.6158E−04 | 1.1626E−05 | 0.0000E+00 | 0.0000E+00 |
| R3 | 2.0434E+01 | 9.2271E−03 | −7.0653E−04 | 0.0000E+00 | 0.0000E+00 |
| R4 | −2.4058E+01 | 1.7805E−02 | −1.3939E−03 | 0.0000E+00 | 0.0000E+00 |
| R5 | −1.7016E+03 | −5.2915E−02 | 4.4939E−03 | 0.0000E+00 | 0.0000E+00 |
| R6 | 1.1030E+03 | 2.8805E−03 | −1.9865E−04 | 0.0000E+00 | 0.0000E+00 |
| R7 | 4.6815E+01 | 3.9015E−03 | −2.9616E−04 | 0.0000E+00 | 0.0000E+00 |
| R8 | −3.5152E+01 | 4.2859E−04 | −2.5936E−05 | 0.0000E+00 | 0.0000E+00 |
| R9 | 2.1549E+02 | −8.2949E−05 | 3.4350E−06 | 0.0000E+00 | 0.0000E+00 |
| R10 | −9.8425E+01 | 3.6322E−07 | −1.1233E−11 | 0.0000E+00 | 0.0000E+00 |
| R11 | −1.0663E+01 | 1.2586E−08 | −3.0284E−10 | 3.3027E−12 | 0.0000E+00 |
| R12 | 3.0173E+00 | 2.4361E−08 | −6.1023E−10 | 6.8013E−12 | 0.0000E+00 |
| R13 | 3.8317E−01 | −1.0995E−08 | 3.0575E−10 | −5.0738E−12 | 3.8039E−14 |
| R14 | −2.5461E+01 | 1.0350E−09 | −2.8677E−11 | 4.6646E−13 | −3.3829E−15 |

Figure 18:
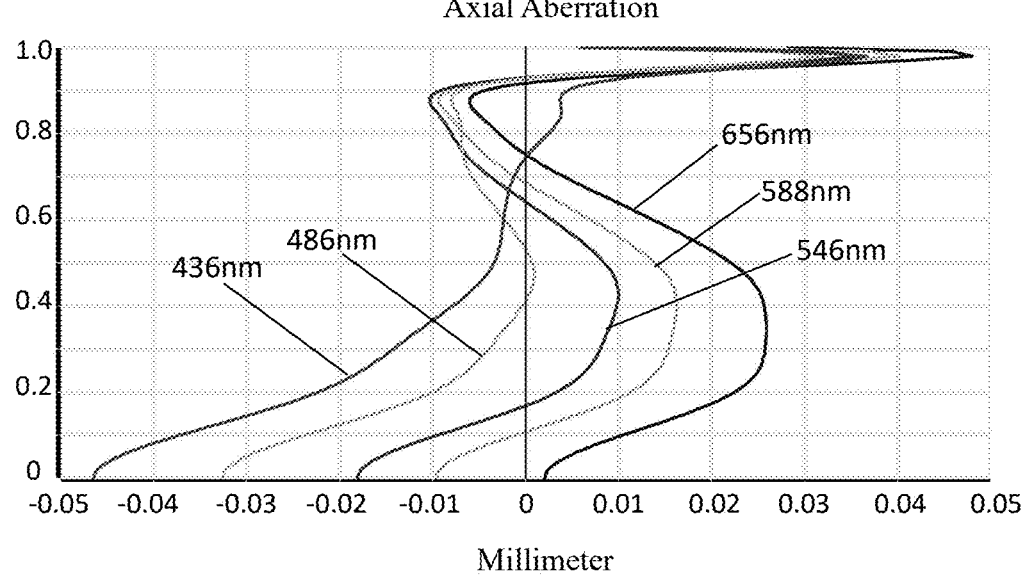
FIG. 18 is a schematic diagram of the axial aberration of the camera optical lens shown in FIG. 17.
Figure 19:
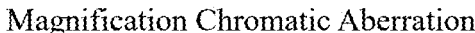
FIG. 19 is a schematic diagram of the magnification chromatic aberration of the camera optical lens shown in FIG. 17.
Figure 19:
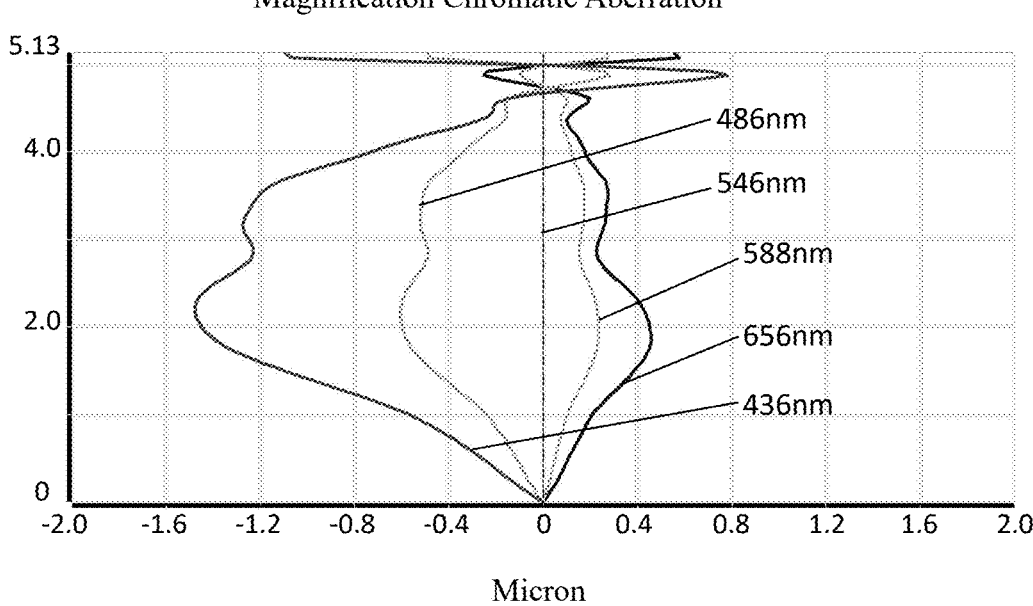
Figure 20:
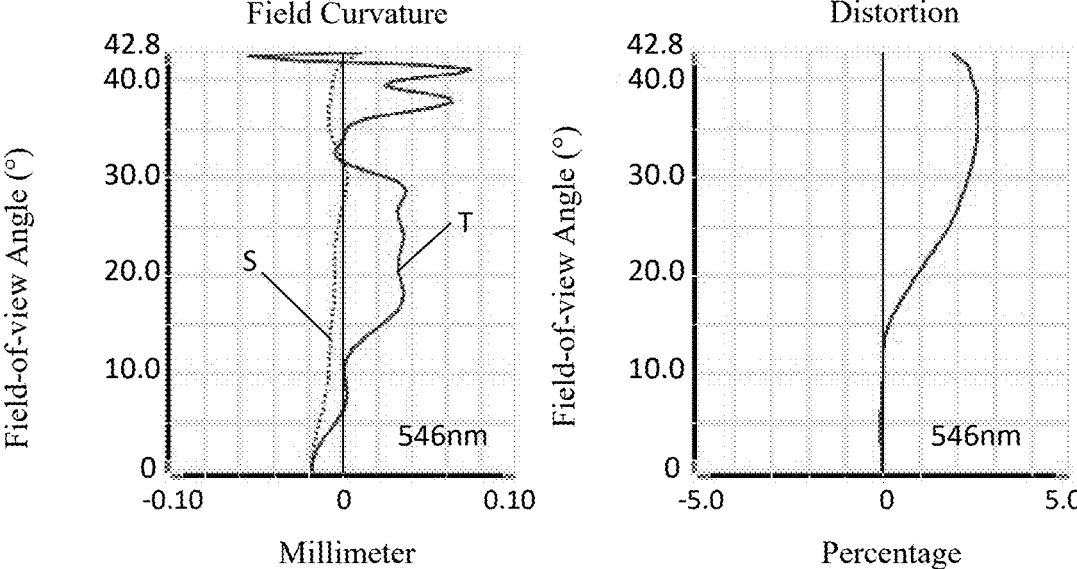
FIG. 20 is a schematic diagram of the field curvature and distortion of the camera optical lens shown in FIG. 17.

FIGS. 18 and 19 illustrates schematic diagrams of the axial aberration and magnification chromatic aberration of light with wavelengths of 656 nm, 588 nm, 546 nm, 486 nm, and 436 nm, respectively, after passing through the camera optical lens 50 of the fifth embodiment. FIG. 20, on the other hand, illustrates a schematic diagram of the field curvature and distortion of light with a wavelength of 546 nm after passing through the camera optical lens 50 of the fifth embodiment. The field curvature S of FIG. 20 is the field curvature in the arc-sagittal direction, and Tis the field curvature in the meridional direction.

In this embodiment, the camera optical lens 50 has an ENPD of 3.305 mm, a full field of view image height (IH) of 5.125 mm, and a field-of-view angle (FOV) of 85.58° in the diagonal direction. The camera optical lens 50 satisfies the design requirements of a large aperture, a wide angle, and an ultra-thinness, and has excellent optical characteristics due to its on-axis and off-axis chromatic aberrations being sufficiently compensated.

Table 13, which appears later, shows the values corresponding to the various values in each of the first, second, third, fourth, and fifth embodiments with respect to the parameters already specified in the relationship expressions.

Comparative Embodiment

The meaning of the symbols of the comparative embodiment is the same as that of the first embodiment.

Figure 21:
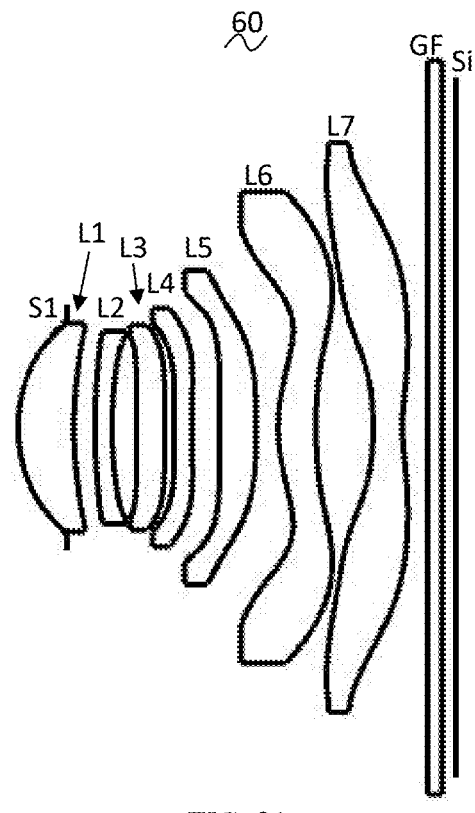
FIG. 21 is a structural schematic diagram of the camera optical lens according to the comparative embodiment.

FIG. 21 shows the camera optical lens 60 according to the comparative embodiment.

Tables 11 and 12 illustrate the design data of the camera optical lens 60 according to the comparative embodiment.

TABLE 11

| | R | d | | nd | | vd | |
|---|---|---|---|---|---|---|---|
| S1 | ∞ | d0= | −0.715 | | | | |
| R1 | 2.161 | d1= | 0.807 | nd1 | 1.4959 | v1 | 81.65 |
| R2 | 6.483 | d2= | 0.302 | | | | |
| R3 | 7.161 | d3= | 0.250 | nd2 | 1.6700 | v2 | 19.39 |
| R4 | 5.543 | d4= | 0.350 | | | | |
| R5 | 49.960 | d5= | 0.413 | nd3 | 1.5444 | v3 | 55.82 |
| R6 | −43.006 | d6= | 0.133 | | | | |
| R7 | 14.579 | d7= | 0.252 | nd4 | 1.6700 | v4 | 19.39 |
| R8 | 8.563 | d8= | 0.399 | | | | |
| R9 | 22.090 | d9= | 0.525 | nd5 | 1.5661 | v5 | 37.71 |
| R10 | 42.018 | d10= | 0.321 | | | | |
| R11 | 2.281 | d11= | 0.551 | nd6 | 1.5444 | v6 | 55.82 |
| R12 | 8.566 | d12= | 0.823 | | | | |
| R13 | −6.718 | d13= | 0.424 | nd7 | 1.5346 | v7 | 55.69 |
| R14 | 2.997 | d14= | 0.363 | | | | |
| R15 | ∞ | d15= | 0.210 | ndg | 1.5168 | vg | 64.17 |
| R16 | ∞ | d16= | 0.202 | | | | |

Table 12 illustrates the aspherical data for each lens in the camera optical lens 60 according to the comparative embodiment.

TABLE 12

| | Cone Coefficient | Asphericity Coefficient | | | | |
|---|---|---|---|---|---|---|
| | k | A4 | A6 | A8 | A10 | A12 |
| R1 | −1.3908E−01 | 1.6432E−03 | 1.9739E−02 | −5.3212E−02 | 1.0393E−01 | −1.3447E−01 |
| R2 | −3.8419E+01 | 1.4687E−02 | −4.7616E−03 | −4.7704E−03 | 1.4075E−02 | −1.8295E−02 |
| R3 | 1.9224E+01 | −3.0483E−02 | 1.3221E−03 | 2.7678E−02 | −1.1796E−01 | 3.0046E−01 |
| R4 | −2.8345E+01 | 7.3791E−03 | −1.7051E−02 | 8.0787E−02 | −2.5025E−01 | 5.5785E−01 |
| R5 | 2.1634E+02 | −1.0744E−02 | 8.9907E−03 | −1.4581E−01 | 5.4329E−01 | −1.2774E+00 |
| R6 | −1.5643E+03 | −1.9281E−02 | −2.5295E−02 | 8.0659E−02 | −1.9451E−01 | 3.0550E−01 |
| R7 | 3.8866E+01 | −8.8889E−02 | 3.1857E−02 | −3.6970E−02 | 3.3268E−02 | 1.1522E−02 |
| R8 | −5.1286E+01 | −6.9933E−02 | 3.4369E−02 | −3.3525E−02 | 1.4053E−02 | 2.3332E−02 |
| R9 | 1.0548E+02 | −5.9216E−02 | 5.6105E−02 | −7.1785E−02 | 9.1104E−02 | −1.0143E−01 |
| R10 | −2.6711E+02 | −1.3426E−01 | 7.7094E−02 | −2.0420E−02 | −1.9356E−02 | 2.7198E−02 |
| R11 | −1.1009E+01 | 1.7189E−02 | −4.0293E−02 | 3.7451E−02 | −2.5657E−02 | 1.0537E−02 |
| R12 | 3.5013E+00 | 3.7273E−02 | −3.2930E−02 | 3.0454E−02 | −2.2749E−02 | 1.0604E−02 |
| R13 | −4.2915E−02 | −1.5989E−01 | 1.4637E−01 | −8.6556E−02 | 3.8501E−02 | −1.2327E−02 |
| R14 | −3.1048E+01 | −6.4340E−02 | 3.4886E−02 | −1.0938E−02 | 1.5100E−03 | 1.8452E−04 |

TABLE 12-continued

| | Cone Coefficient | Asphericity Coefficient | | | | |
|---|---|---|---|---|---|---|
| | k | A14 | A16 | A18 | A20 | A22 |
| R1 | −1.3908E−01 | 1.1974E−01 | −7.4151E−02 | 3.1813E−02 | −9.2432E−03 | 1.7276E−03 |
| R2 | −3.8419E+01 | 1.7079E−02 | −1.2877E−02 | 7.7423E−03 | −3.3891E−03 | 9.7441E−04 |
| R3 | 1.9224E+01 | −4.8388E−01 | 5.1517E−01 | −3.6816E−01 | 1.7481E−01 | −5.2889E−02 |
| R4 | −2.8345E+01 | −8.5178E−01 | 8.9781E−01 | −6.5038E−01 | 3.1703E−01 | −9.8971E−02 |
| R5 | 2.1634E+02 | 2.0165E+00 | −2.1933E+00 | 1.6472E+00 | −8.3830E−01 | 2.7583E−01 |
| R6 | −1.5643E+03 | −3.4640E−01 | 2.8521E−01 | −1.6816E−01 | 6.8856E−02 | −1.8441E−02 |
| R7 | 3.8866E+01 | −9.8640E−02 | 1.5492E−01 | −1.3256E−01 | 6.9309E−02 | −2.2017E−02 |
| R8 | −5.1286E+01 | −5.3778E−02 | 5.3993E−02 | −3.2752E−02 | 1.2693E−02 | −3.0833E−03 |
| R9 | 1.0548E+02 | 8.4093E−02 | −4.8983E−02 | 1.9509E−02 | −5.1686E−03 | 8.6688E−04 |
| R10 | −2.6711E+02 | −1.6203E−02 | 5.6605E−03 | −1.2205E−03 | 1.5968E−04 | −1.1639E−05 |
| R11 | −1.1009E+01 | −2.7429E−03 | 4.8255E−04 | −5.9421E−05 | 5.1694E−06 | −3.1295E−07 |
| R12 | 3.5013E+00 | −3.1853E−03 | 6.4431E−04 | −8.9863E−05 | 8.6763E−06 | −5.7022E−07 |
| R13 | −4.2915E−02 | 2.7912E−03 | −4.5025E−04 | 5.2256E−05 | −4.3774E−06 | 2.6248E−07 |
| R14 | −3.1048E+01 | −1.3268E−04 | 3.0494E−05 | −4.2040E−06 | 3.8619E−07 | −2.4275E−08 |

| | Cone Coefficient | Asphericity Coefficient | | | |
|---|---|---|---|---|---|
| | k | A24 | A26 | A28 | A30 |
| R1 | −1.3908E−01 | −1.8607E−04 | 8.6803E−06 | 0.0000E+00 | 0.0000E+00 |
| R2 | −3.8419E+01 | −1.6151E−04 | 1.1599E−05 | 0.0000E+00 | 0.0000E+00 |
| R3 | 1.9224E+01 | 9.2266E−03 | −7.0622E−04 | 0.0000E+00 | 0.0000E+00 |
| R4 | −2.8345E+01 | 1.7798E−02 | −1.3932E−03 | 0.0000E+00 | 0.0000E+00 |
| R5 | 2.1634E+02 | −5.2901E−02 | 4.4871E−03 | 0.0000E+00 | 0.0000E+00 |
| R6 | −1.5643E+03 | 2.8812E−03 | −1.9855E−04 | 0.0000E+00 | 0.0000E+00 |
| R7 | 3.8866E+01 | 3.9021E−03 | −2.9613E−04 | 0.0000E+00 | 0.0000E+00 |
| R8 | −5.1286E+01 | 4.2849E−04 | −2.5975E−05 | 0.0000E+00 | 0.0000E+00 |
| R9 | 1.0548E+02 | −8.2949E−05 | 3.4381E−06 | 0.0000E+00 | 0.0000E+00 |
| R10 | −2.6711E+02 | 3.6317E−07 | −1.0734E−12 | 0.0000E+00 | 0.0000E+00 |
| R11 | −1.1009E+01 | 1.2586E−08 | −3.0284E−10 | 3.3027E−12 | 0.0000E+00 |
| R12 | 3.5013E+00 | 2.4361E−08 | −6.1023E−10 | 6.8013E−12 | 0.0000E+00 |
| R13 | −4.2915E−02 | −1.0995E−08 | 3.0575E−10 | −5.0738E−12 | 3.8039E−14 |
| R14 | −3.1048E+01 | 1.0350E−09 | −2.8677E−11 | 4.6646E−13 | −3.3828E−15 |

Figure 22:
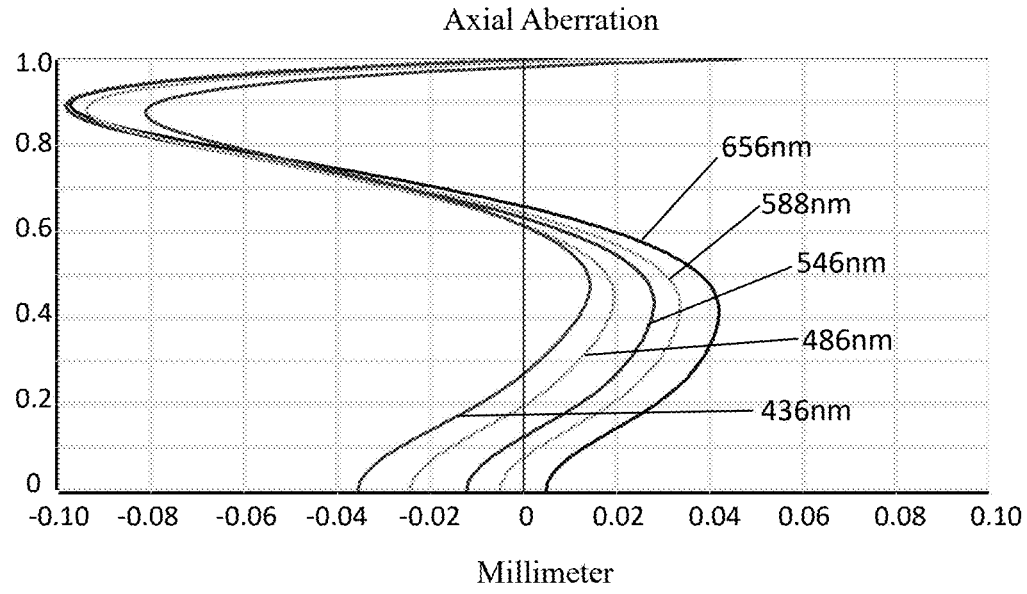
FIG. 22 is a schematic diagram of the axial aberration of the camera optical lens shown in FIG. 21.
Figure 23:
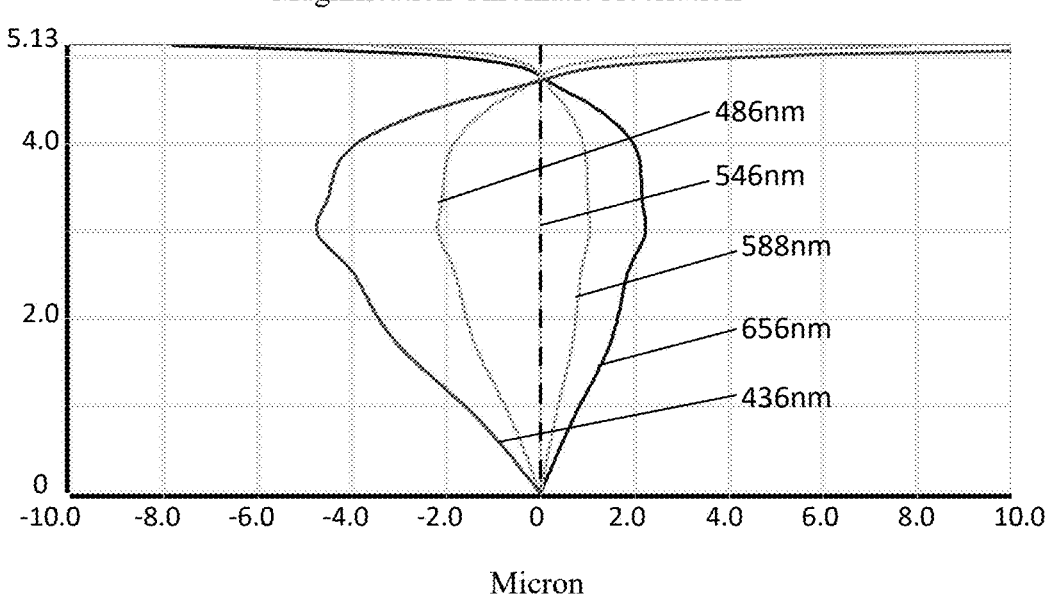
FIG. 23 is a schematic diagram of the magnification chromatic aberration of the camera optical lens shown in FIG. 21.
Figure 24:
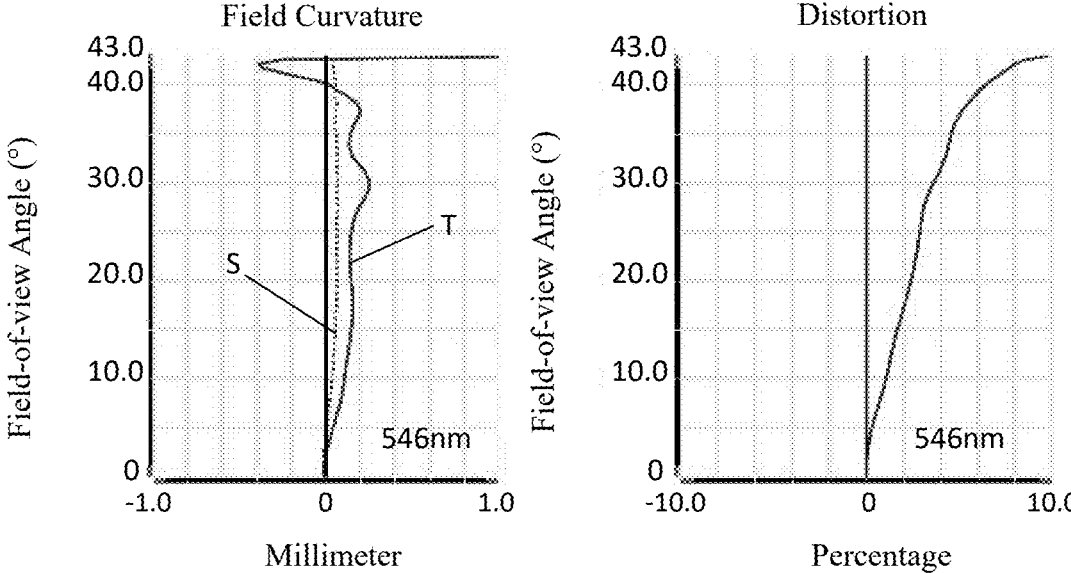
FIG. 24 is a schematic diagram of the field curvature and distortion of the camera optical lens shown in FIG. 21.

FIGS. 22 and 23 illustrate the axial aberration and magnification chromatic aberration of light with wavelengths of 656 nm, 588 nm, 546 nm, 486 nm, and 436 nm, respectively, after passing through the camera optical lens 60 of the comparative embodiment. FIG. 24 shows a schematic diagram of field curvature and distortion of light of wavelength 546 nm passing through the camera optical lens 60 of the comparative embodiment. The field curvature S of FIG. 24 is the field curvature in the arc-sagittal direction, and T is the field curvature in the meridian direction.

embodiment does not satisfy the above relationship expression: 0.95≤f1/f≤1.25, affecting the imaging quality.

In the comparative embodiment, the camera optical lens 60 has an ENPD of 3.056 mm, a full field of view image height (IH) of 5.125 mm, and a field-of-view angle (FOV) of 85.98° in the diagonal direction. The camera optical lens 60 does not satisfy the design requirements of having excellent optical performance, a large aperture, a wide-angle, and an ultra-thin design.

TABLE 13

| Parameters and relationship expressions | First Embodiment | Second Embodiment | Third Embodiment | Fourth Embodiment | Sixth Embodiment | Comparative Embodiment |
|---|---|---|---|---|---|---|
| f1/f | 1.099 | 0.956 | 1.129 | 1.196 | 1.069 | 1.241 |
| v1 | 81.650 | 81.650 | 60.480 | 81.650 | 81.650 | 81.650 |
| R13/R14 | −1.942 | −1.008 | −1.874 | −2.254 | −2.497 | −2.242 |
| d4/d6 | 2.968 | 1.511 | 3.496 | 2.741 | 5.000 | 2.632 |
| f | 5.348 | 5.649 | 5.372 | 5.196 | 5.346 | 4.943 |
| f1 | 5.877 | 5.400 | 6.067 | 6.216 | 5.714 | 6.135 |
| f2 | −35.148 | −25.531 | −31.608 | −41.214 | −29.001 | −38.588 |
| f3 | 52.397 | 93.308 | 57.711 | 36.015 | 57.852 | 42.340 |
| f4 | −28.995 | −21.292 | −40.685 | −29.020 | −167.307 | −31.132 |
| f5 | 97.692 | −57.285 | 98.444 | 70.361 | −80.230 | 80.986 |
| f6 | 5.782 | 5.220 | 5.712 | 5.545 | 6.086 | 5.516 |
| f7 | −3.533 | −3.986 | −3.474 | −3.314 | −3.533 | −3.802 |
| FNO | 1.618 | 1.617 | 1.617 | 1.617 | 1.618 | 1.617 |
| TTL | 6.379 | 6.613 | 6.494 | 6.296 | 6.339 | 6.325 |

Table 13 below lists the values corresponding to each of the relationship expressions in the comparative embodiment in accordance with the above relationship expressions. Obviously, the camera optical lens 60 of the comparative It can be understood by those of ordinary skill in the art that each of the above embodiments is a specific embodiment for realizing the present application, and that various changes can be made thereto in form and detail in practical application without departing from the spirit and scope of the present application.

What is claimed is:

1. A camera optical lens, comprising seven lenses, the seven lenses being in order from an objective side to an image side: a first lens having a positive refractive force, a second lens having a negative refractive force, a third lens having a positive refractive force, a fourth lens having a negative refractive force, a fifth lens having a refractive force, a sixth lens having a positive refractive force, and a seventh lens having a negative refractive force lens;

wherein a focal length of the first lens is f1; a focal length of the camera optical lens is f; an Abbe number of the first lens is v1; a central radius of curvature of an objective surface of the seventh lens is R13; a central radius of curvature of an image surface of the seventh lens is R14, an on-axis distance between the second lens and the third lens is d4; an on-axis distance between the third lens and the fourth lens is d6, and the following relationship expressions are satisfied:

$$0.95 \le f1/f \le 1.25;$$

$$60.00 \le v1 \le 82.00;$$

$$-4.00 \le R13/R14 \le -1.00;$$

$$1.50 \le d4/d6 \le 5.00.$$

2. The camera optical lens of claim 1, wherein a central radius of curvature of an objective surface of the fourth lens is R7; a central radius of curvature of an image surface of the fourth lens is R8, and the following relationship expression is satisfied:

$$2.00 \le (R7 + R8)/(R7 - R8) \le 20.00.$$

3. The camera optical lens of claim 1, wherein an objective surface of the first lens is convex at a proximal-axis position, and an image surface of the first lens is concave at a proximal-axis position;

a central radius of curvature of the objective surface of the first lens is R1, and a central radius of curvature of the image surface of the first lens is R2; an on-axis thickness of the first lens is d1; a total track length of the camera optical lens is TTL, and the following relationship expressions are satisfied:

$$-4.14 \le (R1 + R2)/(R1 - R2) \le -1.06;$$

$$0.06 \le d1/TTL \le 0.21.$$

4. The camera optical lens of claim 1, wherein an objective surface of the second lens is convex at a proximal-axis position, and an image surface of the second lens is concave at a proximal-axis position;

a focal length of the second lens is f2; a central radius of curvature of the objective surface of the second lens is R3, and a central radius of curvature of the image surface of the second lens is R4; an on-axis thickness of the second lens is d3; a total track length of the camera optical lens is TTL, and the following relationship expressions are satisfied:

$$-15.86 \le f2/f \le -3.01;$$

$$2.67 \le (R3 + R4)/(R3 - R4) \le 12.77;$$

$$0.02 \le d3/TTL \le 0.05.$$

5. The camera optical lens of claim 1, wherein an image surface of the third lens is convex at a proximal-axis position;

a focal length of the third lens is f3; a central radius of curvature of an objective surface of the third lens is R5, and a central radius of curvature of the image surface of the third lens is R6; an on-axis thickness of the third lens is d5; a total track length of the camera optical lens is TTL, and the following relationship expressions are satisfied:

$$3.47 \le f3/f \le 24.78;$$

$$-0.25 \le (R5 + R6)/(R5 - R6) \le 1.61;$$

$$0.03 \le d5/TTL \le 0.12.$$

6. The camera optical lens of claim 1, wherein an objective surface of the fourth lens is convex at a proximal-axis position, and an image surface of the fourth lens is concave at a proximal-axis position;

a focal length of the fourth lens is f4; an on-axis thickness of the fourth lens is d7; a total track length of the camera optical lens is TTL, and the following relationship expressions are satisfied:

$$-62.59 \le f4/f \le -2.51;$$

$$0.02 \le d7/TTL \le 0.06.$$

7. The camera optical lens of claim 1, wherein an objective surface of the fifth lens is convex at a proximal-axis position, and an image surface of the fifth lens is concave at a proximal-axis position;

a focal length of the fifth lens is f5; a central radius of curvature of the objective surface of the fifth lens is R9, and a central radius of curvature of the image surface of the fifth lens is R10; an on-axis thickness of the fifth lens is d9; a total track length of the camera optical lens is TTL, and the following relationship expressions are satisfied:

$$-30.01 \le f5/f \le 27.49;$$

$$-7.90 \le (R9 + R10)/(R9 - R10) \le 6.02;$$

$$0.04 \le d9/TTL \le 0.13.$$

8. The camera optical lens of claim 1, wherein an objective surface of the sixth lens is convex at a proximal-axis position, and an image surface of the sixth lens is concave at a proximal-axis position;

a focal length of the sixth lens is f6; a central radius of curvature of the objective surface of the sixth lens is R11, and a central radius of curvature of the image surface of the sixth lens is R12; an on-axis thickness of the sixth lens is d11; a total track length of the camera optical lens is TTL, and the following relationship expressions are satisfied:

$$0.46 \le f6/f \le 1.71;$$

$$-3.58 \le (R11 + R12)/(R11 - R12) \le -1.11;$$

$$0.04 \le d11/TTL \le 0.13.$$

9. The camera optical lens of claim 1, wherein the objective surface of the seventh lens is concave at a proximal-axis position, and the image surface of the seventh lens is concave at a proximal-axis position;

a focal length of the seventh lens is f7; an on-axis thickness of the seventh lens is d13; a total track length of the camera optical lens is TTL, and the following relationship expressions are satisfied:

$$-1.41 \le f7/f \le -0.43;$$

$$0.02 \le d13/TTL \le 0.09.$$

10. The camera optical lens of claim 1, wherein the first lens is made of glass.

\* \* \* \* \*